US012067847B2

(12) United States Patent
Loader et al.

(10) Patent No.: US 12,067,847 B2
(45) Date of Patent: *Aug. 20, 2024

(54) SYSTEMS AND METHODS FOR PLAYING AN ELECTRONIC GAME INCLUDING A STOP-BASED BONUS GAME

(71) Applicant: Aristocrat Technologies Australia Pty Limited, North Ryde (AU)

(72) Inventors: James Loader, Gosford (AU); Matthew Chan, Gordon (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 135 days.

This patent is subject to a terminal disclaimer.

(21) Appl. No.: 17/929,972

(22) Filed: Sep. 6, 2022

(65) Prior Publication Data

US 2023/0005341 A1 Jan. 5, 2023

Related U.S. Application Data

(63) Continuation of application No. 16/777,879, filed on Jan. 30, 2020, now Pat. No. 11,450,179, which is a (Continued)

(51) Int. Cl.
*G07F 17/32* (2006.01)

(52) U.S. Cl.
CPC ...... *G07F 17/3267* (2013.01); *G07F 17/3209* (2013.01); *G07F 17/3213* (2013.01); *G07F 17/3265* (2013.01); *G07F 17/3269* (2013.01)

(58) Field of Classification Search
None
See application file for complete search history.

(56) References Cited

U.S. PATENT DOCUMENTS 6,448,987 B1 9/2002 Easty
D512,464 S 12/2005 Karstens
(Continued)

FOREIGN PATENT DOCUMENTS

EP 1879143 A2 1/2008
EP 1979059 A1 10/2008
WO 2007077449 A1 7/2007

OTHER PUBLICATIONS

U.S. Office Action dated Aug. 20, 2019, in U.S. Appl. No. 16/109,048.
(Continued)

*Primary Examiner* — Ronald Laneau
(74) *Attorney, Agent, or Firm* — Weaver Austin Villeneuve & Sampson LLP

(57) ABSTRACT

Gaming systems, methods, and machines provided herein may be used to provide bonus games that are associated with two different classes of awards, e.g., one or more first awards and one or more second awards. The first award(s) may generally be much more desirable to players than the second award(s), e.g., the first awards may be large-denomination jackpot awards, whereas the second awards may be small-denomination credit awards, e.g., non-jackpot awards. During play of such bonus games, selection of a stop position associated with a second award may cause that stop position to be instead associated with one of the one or more first awards for future play of the bonus game, thereby increasing the opportunities to win a first award in subsequent play of the bonus game.

20 Claims, 12 Drawing Sheets

Related U.S. Application Data continuation of application No. 16/109,048, filed on Aug. 22, 2018, now Pat. No. 10,621,829.

(60) Provisional application No. 62/553,241, filed on Sep. 1, 2017.

(56) References Cited

U.S. PATENT DOCUMENTS

D590,835 S 4/2009 Richter
D590,838 S 4/2009 Bisig
7,571,910 B1 8/2009 Launzel
D607,009 S 12/2009 McEnaney
D614,192 S 4/2010 Takano
8,460,082 B2 6/2013 Harris
D699,747 S 2/2014 Pearson
8,845,427 B2 * 9/2014 Timperley .......... G07F 17/3267 463/31
D758,395 S 6/2016 Gutierrez
D763,265 S 8/2016 Trujillo
D780,201 S 2/2017 Zielinski
D783,654 S 4/2017 Hu
D783,655 S 4/2017 Hu
D785,016 S 4/2017 Berwick
D786,269 S 5/2017 Lin
D787,547 S 5/2017 Basargin
D791,794 S 7/2017 Gaggiotti
D791,795 S 7/2017 Gaggiotti
D794,065 S 8/2017 Lider
D804,498 S 12/2017 Akatsu
9,836,913 B2 12/2017 Manz
D807,384 S 1/2018 Quattrocchi
9,855,555 B2 * 1/2018 White ............... B01L 3/502784
D818,489 S 5/2018 Lider
9,972,161 B2 * 5/2018 Bernard .............. G07F 17/3211
D834,589 S 11/2018 Duran
10,311,668 B1 6/2019 Halvorson
D861,703 S 10/2019 Suslik
D867,374 S 11/2019 Flood
D868,803 S 12/2019 Suslik
D876,450 S 2/2020 Suslik
10,621,829 B2 4/2020 Loader
D889,556 S 7/2020 Marks
D900,130 S 10/2020 Matos
D904,436 S 12/2020 Swaminath
10,867,478 B2 12/2020 Hendricks
D907,655 S 1/2021 Adachi
D907,660 S 1/2021 Lee
D917,551 S 4/2021 Lee
D921,013 S 6/2021 Boese
D924,248 S 7/2021 Boese
11,158,171 B2 10/2021 Burns
2003/0211879 A1 11/2003 Englman
2004/0110555 A1 6/2004 Devaull
2006/0025198 A1 2/2006 Gail
2006/0247018 A1 11/2006 Walker
2008/0163056 A1 7/2008 Lamadon
2008/0209546 A1 8/2008 Kim
2008/0300040 A1 12/2008 Goto
2009/0143141 A1 6/2009 Wells
2009/0239633 A1 9/2009 Bennett
2010/0120495 A1 5/2010 Frank
2010/0234091 A1 * 9/2010 Baerlocher ............. G07F 17/34 463/43
2010/0241979 A1 9/2010 Apted
2011/0117992 A1 5/2011 Nelson
2011/0151957 A1 6/2011 Falciglia, Sr.
2011/0218027 A1 9/2011 Manz
2012/0122545 A1 * 5/2012 Watkins .............. G07F 17/3211 463/20
2012/0122571 A1 5/2012 Desimone
2012/0244928 A1 9/2012 Visser
2013/0065665 A1 3/2013 Watkins
2013/0157741 A1 6/2013 Pacey
2013/0281207 A1 10/2013 Lyons
2014/0087855 A1 3/2014 Caputo
2014/0120998 A1 5/2014 Chang
2014/0194182 A1 * 7/2014 Young ................. G07F 17/3213 463/20
2014/0364193 A1 12/2014 Williamson
2016/0035176 A1 2/2016 Forman
2018/0102027 A1 4/2018 Paiva
2018/0293847 A1 * 10/2018 Hendricks ........... G07F 17/3213
2019/0073875 A1 3/2019 Loader
2019/0088077 A1 3/2019 Zehetner

OTHER PUBLICATIONS

US Unpublished U.S. Appl. No. 29/616,332, filed Sep. 5, 2017, Suslik.

U.S. Notice of Allowance dated Jul. 17, 2019, in U.S. Appl. No. 29/665,193.

Office Action dated Mar. 21, 2019 for U.S. Appl. No. 29/665,193 (pp. 1-12).

Notice of Allowance dated Sep. 3, 2019 for U.S. Appl. No. 29/665,193 (pp. 1-7).

Corrected Notice of Allowability dated Jan. 27, 2020 for U.S. Appl. No. 29/665,193 (pp. 1-3).

Notice of Allowance dated Jan. 17, 2020 for U.S. Appl. No. 16/109,048 (pp. 1-5).

Office Action dated Jun. 10, 2020 for U.S. Appl. No. 15/891,769 (pp. 1-14).

Office Action dated Mar. 17, 2021 for U.S. Appl. No. 29/715,431 (pp. 1-9).

Super Wheel Blast Slot—Jackpot Wheel Free Spins—Big Win on Miss Liberty!, by TheBigPayback—Slot Machine Videos, dated Oct. 14, 2016, youtube.com [online]. Retrieved Mar. 12, 2021 from internet <URL:https://www.youtube.com/watch?v=SiJsyEeIXIk> (Year : 2016).

New Slot! Ulti Mate Wheel Blast First Attempt—New Features!, Albert's Slot Channel—Slot Machine Videos, dated Sep. 30, 2019, youtube.com [online]. Retrieved Mar. 12, 2021 from internet <URL:https://www.youtube.com/watch?v=BV21Yw4Grdg> ( Year: 2019).

Notice of Allowance dated Jul. 30, 2021 for U.S. Appl. No. 29/715,431 (pp. 1-8).

Office Action dated Jul. 21, 2021 for U.S. Appl. No. 29/718,151 (pp. 1-10).

Notice of Allowance dated Nov. 5, 2021 for U.S. Appl. No. 29/715,431 (pp. 1-6).

Office Action (Non-Final Rejection) dated Nov. 15, 2021 for U.S. Appl. No. 16/777,879 (pp. 1-9).

Notice of Allowance dated Dec. 16, 2021 for U.S. Appl. No. 29/718,151 (pp. 1-5).

Office Action (Notice of Allowance and Fees Due (PTOL-85)) dated May 12, 2022 for U.S. Appl. No. 16/777,879 (pp. 1-5).

* cited by examiner

...

SYSTEMS AND METHODS FOR PLAYING AN ELECTRONIC GAME INCLUDING A STOP-BASED BONUS GAME

CROSS-REFERENCE TO RELATED APPLICATIONS

This application is a continuation under 35 U.S.C. § 120 of U.S. patent application Ser. No. 16/777,879, filed Jan. 30, 2020, which is a continuation under 35 U.S.C. § 120 of U.S. patent application Ser. No. 16/109,048, filed Aug. 22, 2018, which claims benefit of priority under 35 U.S.C. § 119(e) to U.S. Provisional Patent Application No. 62/553,241, filed Sep. 1, 2017, all of which are hereby incorporated herein by reference in their entireties and for all purposes.

BACKGROUND

The field of disclosure relates generally to electronic gaming, and more particularly to systems and methods of playing an electronic game including a stop-based bonus game.

Electronic gaming machines ("EGMs"), also referred to herein simply as gaming machines, or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

As alluded to earlier herein, some gaming machines are configured to present a bonus game in response to the occurrence of a bonus condition or bonus trigger in a base, or primary, game. Specifically, a player may qualify for a bonus game based upon one or more base game outcomes. A bonus game may be played in accordance with rules that are different from the rules of the base game, and prizes or awards generated during the bonus game may be different from prizes and awards generated during the base game.

SUMMARY

As the number and variety of available gaming systems increases, gaming systems operators, such as casinos, continue to strive for the design and implementation of new and exciting gaming systems. The present disclosure is therefore directed to such gaming systems. In particular, the present invention is directed to gaming systems and methods including a stop-based bonus game, e.g., a wheel or reel with multiple stops, although the concepts discussed herein may also be applicable to various other types of bonus games.

Gaming systems, methods, and machines discussed herein may be used to provide bonus games that are associated with two different classes of awards, e.g., one or more first awards and one or more second awards. The first award(s) may generally be much more desirable to players than the second award(s), e.g., the first awards may be large-denomination jackpot awards, whereas the second awards may be small-denomination credit awards, e.g., non-jackpot awards. During play of such bonus games, selection of a stop position associated with a second award may cause that stop position to be instead associated with one of the one or more first awards for future play of the bonus game, thereby increasing the opportunities to win a first award in subsequent play of the bonus game.

In some implementations, a method of electronic gaming may be implemented using a gaming system. The gaming system may include a player input interface, a credit input mechanism including at least one of a card reader, a ticket reader, a bill validator, a coin input mechanism, and one or more displays configured to display a wagering game. The credit input mechanism may be configured to establish a credit balance that is increasable and decreasable based on wagering activity. The gaming system may also include a tangible, nontransitory, computer-readable memory and a processor communicatively coupled to the memory. The method may include initiating, by the processor and in response to a primary game outcome of the wagering game, a bonus game; causing, by the processor and in association with the bonus game, a bonus wheel that includes a plurality of stop positions to be displayed on the one or more displays, at least one of the plurality of stop positions associated with a secondary jackpot wheel; selecting, by the processor, a first stop position from the plurality of stop positions included on the bonus wheel; determining, by the processor, that the selected first stop position is associated with the secondary jackpot wheel; displaying, by the processor, the secondary jackpot wheel, the secondary jackpot wheel including a plurality of stop positions, each of the plurality of stop positions associated with one of i) one of a plurality of jackpot awards and ii) one of a plurality of credit prizes; selecting, by the processor, a first stop position from the plurality of stop positions displayed on the secondary jackpot wheel, the first stop position associated with a first credit prize of the plurality of credit prizes; and replacing, by the processor, the first credit prize associated with the first stop position with a first jackpot award of the plurality of jackpot awards, such that the first stop position is associated with the first jackpot award rather than the first credit prize.

In some implementations, the method may further include awarding, by the processor, the first credit prize to the player.

In some implementations, the method may further include awarding, by the processor, the first credit prize to the player prior to replacing the first credit prize with the first jackpot award.

In some implementations, the method may further include displaying, by the processor and in response to the replacing, the bonus wheel, the bonus wheel including the first stop position associated with the first jackpot award rather than the first credit prize.

In some such implementations, the method may further include selecting, by the processor and from the bonus wheel, a second stop position from the plurality of stop positions included on the bonus wheel. In some additional implementations, the method may further include determining, by the processor, that the second stop position is associated with a second credit prize of the plurality of credit prizes. In some implementations, the method may further include replacing, by the processor, the second credit prize associated with the second stop position with a second jackpot award of the plurality of jackpot awards, such that the second stop position is associated with the second jackpot award rather than the second credit prize.

In some implementations, an electronic gaming system may be provided that includes a display configured to display a wagering game; a player input interface configured to receive a player input; a credit input mechanism including at least one of a card reader, a ticket reader, a bill acceptor, and a coin input mechanism, the credit input mechanism configured to receive a credit wager, the credit wager initiating play of the wagering game; a processor for controlling the wagering game; and a tangible, non-transitory, computer-readable storage medium having instructions stored thereon that, in response to execution by the processor, cause the processor to perform operations including: initiating, by the processor and in response to a primary game outcome of the wagering game, a bonus game; displaying, by the processor and in association with the bonus game, a bonus wheel, the bonus wheel including a plurality of stop positions, at least one of the plurality of stop positions associated with a secondary jackpot wheel; selecting, by the processor, a first stop position from the plurality of stop positions included on the bonus wheel; determining, by the processor, that the selected first stop position is associated with the secondary jackpot wheel; displaying, by the processor, the secondary jackpot wheel, the secondary jackpot wheel including a plurality of stop positions, each of the plurality of stop positions associated with one of i) one of a plurality of jackpot awards and ii) one of a plurality of credit prizes; selecting, by the processor, a first stop position from the plurality of stop positions displayed on the secondary jackpot wheel, the first stop position associated with a first credit prize of the plurality of credit prizes; and replacing, by the processor, the first credit prize associated with the first stop position with a first jackpot award of the plurality of jackpot awards, such that the first stop position is associated with the first jackpot award rather than the first credit prize.

In some implementations of the electronic gaming system, the instructions may further cause the processor to perform operations including awarding, by the processor, the first credit prize to the player. In some implementations of the electronic gaming system, the instructions may further cause the processor to perform operations including awarding, by the processor, the first credit prize to the player prior to replacing the first credit prize with the first jackpot award.

In some implementations of the electronic gaming system, the instructions may further cause the processor to perform operations including causing, by the processor and in response to the replacing, a display of the bonus wheel, the bonus wheel including the first stop position associated with the first jackpot award rather than the first credit prize.

In some implementations of the electronic gaming system, the instructions may further cause the processor to perform operations including selecting, by the processor and from the bonus wheel, a second stop position from the plurality of stop positions included on the bonus wheel.

In some implementations of the electronic gaming system, the instructions may further cause the processor to perform operations including determining, by the processor, that the second stop position is associated with a second credit prize of the plurality of credit prizes.

In some implementations of the electronic gaming system, the instructions may further cause the processor to perform operations including replacing, by the processor, the second credit prize associated with the second stop position with a second jackpot award of the plurality of jackpot awards, such that the second stop position is associated with the second jackpot award rather than the second credit prize.

In some implementations, an article of manufacture may be provided. The article of manufacture may include a non-transitory, tangible, computer readable storage medium having instructions stored thereon that, in response to execution by a processor configured for electronic gaming, cause the processor to perform operations including: initiating, by the processor and in response to a primary game outcome of the wagering game, a bonus game; displaying, by the processor and in association with the bonus game, a bonus wheel, the bonus wheel including a plurality of stop positions, at least one of the plurality of stop positions associated with a secondary jackpot wheel; selecting, by the processor, a first stop position from the plurality of stop positions included on the bonus wheel; determining, by the processor, that the selected first stop position is associated with the secondary jackpot wheel; displaying, by the processor, the secondary jackpot wheel, the secondary jackpot wheel including a plurality of stop positions, each of the plurality of stop positions associated with one of i) one of a plurality of jackpot awards and ii) one of a plurality of credit prizes; selecting, by the processor, a first stop position from the plurality of stop positions displayed on the secondary jackpot wheel, the first stop position associated with a first credit prize of the plurality of credit prizes; and replacing, by the processor, the first credit prize associated with the first stop position with a first jackpot award of the plurality of jackpot awards, such that the first stop position is associated with the first jackpot award rather than the first credit prize.

In some implementations of the article of manufacture, the instructions may further cause the processor to perform operations including awarding, by the processor, the first credit prize to the player.

In some implementations of the article of manufacture, the instructions may further cause the processor to perform operations including awarding, by the processor, the first credit prize to the player prior to replacing the first credit prize with the first jackpot award.

In some implementations of the article of manufacture, the instructions may further cause the processor to perform operations including displaying, by the processor and in response to the replacing, the bonus wheel, the bonus wheel including the first stop position associated with the first jackpot award rather than the first credit prize.

In some implementations of the article of manufacture, the instructions may further cause the processor to perform operations including selecting, by the processor and from the bonus wheel, a second stop position from the plurality of stop positions included on the bonus wheel.

In some implementations of the article of manufacture, the instructions may further cause the processor to perform operations including determining, by the processor, that the second stop position is associated with a second credit prize of the plurality of credit prizes.

In some implementations of the article of manufacture, the instructions may further cause the processor to perform operations including replacing, by the processor, the second credit prize associated with the second stop position with a second jackpot award of the plurality of jackpot awards, such that the second stop position is associated with the second jackpot award rather than the second credit prize.

In some implementations, an electronic gaming system may be provided. The electronic gaming system may include one or more displays and a game controller that includes one or more processors and one or more memory devices. The one or more processors, the one or more memory devices, and the one or more displays may be operably connected and the one or more memory devices may store computer-executable instructions for controlling the one or more processors to: (a) cause a first bonus game associated with one or more first awards and one or more second awards to be displayed on the one or more displays, the first bonus game including a depiction of a first construct having a plurality of first stop positions that are each associated with an award selected from the group consisting of: the first awards and the second awards (the first construct may include graphical indicators of each first stop position and of the award associated with each first stop position); (b) receive an indication of one or more trigger events; (c) select one or more of the first stop positions responsive, at least in part, to receipt of each indication of one of the one or more trigger events; and (d) cause at least one of the one or more first stop positions that are selected in response to receipt of the indication of one of the one or more trigger events and are, at the time of such selection, associated with one of the one or more second awards to be associated with one of the one or more first awards instead.

In some implementations of the electronic gaming system, each of the one or more first awards may be a jackpot award and each of the one or more second awards may be a non-jackpot award.

In some implementations of the electronic gaming system, each of the non-jackpot awards may be a fixed credit amount, a multiplier bonus applicable in a primary wagering game of the electronic gaming system, one or more wild symbols applicable in the primary wagering game of the electronic gaming system, a free play of the first bonus game, a free play of a base game associated with the first bonus game, a free play of a second bonus game, an additional selection of one of the stop symbols, or a no-value award.

In some implementations of the electronic gaming system, each of the one or more jackpot awards may be a progressive award, an award with a value selected from a set of one or more award values associated with the wagering game that are at least four times higher than a highest award value of the wagering game that is not in the set of one or more award values, or an award with a value selected from a set of one or more award values associated with the wagering game that are at least forty times higher than a highest award value of the wagering game that is not in the set of one or more award values.

In some implementations of the electronic gaming system, the construct may be one or more wheels, one or more reels, one or more dice, or a grid-based treasure map.

In some implementations of the electronic gaming system, the one or more memory devices may further store additional computer-executable instructions for further controlling the one or more processors to: cause, responsive to one of the first stop positions associated with one of the one or more non-jackpot awards being selected, the non-jackpot award associated with that selected first stop position to be awarded to a first player; and cause, responsive to at least one of the first stop positions associated with one of the one or more jackpot awards being selected, the jackpot award associated with that selected first stop position to be awarded to the first player.

In some implementations of the electronic gaming system, the one or more memory devices may further store additional computer-executable instructions for further controlling the one or more processors to cause the graphical indicator for each first stop position associated with one of the one or more first awards to update to indicate the associated first award responsive to (d).

In some implementations of the electronic gaming system, the one or more memory devices may further store additional computer-executable instructions for further controlling the one or more processors to: cause a base game to be displayed on the one or more displays; cause a second bonus game to be displayed on the one or more displays, the second bonus game including a depiction of a second construct having a plurality of second stop positions (one or more of the second stop positions may be associated with an opportunity to play the first bonus game); and cause, responsive to an outcome of the base game, a second stop position of the plurality of second stop positions to be selected. In such an implementation, the selection of the second stop position may be one of the trigger events.

In some implementations of the electronic gaming system, the one or more memory devices may further store additional computer-executable instructions for further controlling the one or more processors to receive a signal indicating a player input after the selection of the second stop position. The receipt of the signal indicating a player input may be another of the one or more trigger events that, in combination with the selection of the second stop position, cause (c) to occur.

In some implementations of the electronic gaming system, the one or more memory devices may further store additional computer-executable instructions for further controlling the one or more processors to reset the associations of the first stop positions with the first and second awards to a default set of associations responsive, at least in part, to an award of one of the one or more first awards.

In some implementations of the electronic gaming system, the one or more memory devices may further store additional computer-executable instructions for further controlling the one or more processors to cause, responsive to an award of one of the one or more first awards, at least the first stop positions associated with that same first award to be reduced in number by at least associating one or more of them with one or more of the one or more second awards instead.

In some implementations of the electronic gaming system, the one or more memory devices may further store additional computer-executable instructions for further controlling the one or more processors to maintain the association of each first stop position with the associated first or second award for that first stop position during play of a base game provided by the electronic gaming machine.

In some implementations of the electronic gaming system, the one or more memory devices may further store additional computer-executable instructions for further controlling the one or more processors to: perform one or more instances of (c) during play of the first bonus game by a first player; perform one or more instances of (c) during play of the first bonus game by a second player who is the next player to play the first bonus game after the first player stops playing the first bonus game; and preserve the associations made in (d) during play of the first bonus game by the first player for play of the first bonus game by the second player.

In some implementations, a method may be provided. The method may include (a) causing a first bonus game associated with one or more first awards and one or more second awards to be displayed on one or more displays of the electronic gaming system, the first bonus game including a depiction of a first construct having a plurality of first stop positions that are each associated with an award selected from the group consisting of: the first awards and the second awards (the first construct may include graphical indicators of each first stop position and of the award associated with each first stop position); (b) receiving an indication of one or more trigger events; (c) selecting one or more of the first stop positions responsive, at least in part, to receipt of each indication of one of the one or more trigger events; and (d) causing at least one of the one or more first stop positions that are selected in response to receipt of the indication of one of the one or more trigger events and are, at the time of such selection, associated with one of the one or more second awards to be associated with one of the one or more first awards instead.

In some implementations of the method, each of the one or more first awards may be a jackpot award and each of the one or more second awards may be a non-jackpot award.

In some implementations of the method, each of the non-jackpot awards may be a fixed credit amount, a multiplier bonus applicable in a primary wagering game of the electronic gaming system, one or more wild symbols applicable in the primary wagering game of the electronic gaming system, a free play of the first bonus game, a free play of a base game associated with the first bonus game, a free play of a second bonus game, an additional selection of one of the stop symbols, or a no-value award.

In some implementations of the method, each of the one or more jackpot awards may be a progressive award, an award with a value selected from a set of one or more award values associated with the wagering game that are at least four times higher than a highest award value of the wagering game that is not in the set of one or more award values, or an award with a value selected from a set of one or more award values associated with the wagering game that are at least forty times higher than a highest award value of the wagering game that is not in the set of one or more award values.

In some implementations of the method, the construct may be one or more wheels, one or more reels, one or more dice, or a grid-based treasure map.

In some implementations of the method, the method may further include causing, responsive to one of the first stop positions associated with one of the one or more non-jackpot awards being selected, the non-jackpot award associated with that selected first stop position to be awarded to a first player; and causing, responsive to at least one of the first stop positions associated with one of the one or more jackpot awards being selected, the jackpot award associated with that selected first stop position to be awarded to the first player.

In some implementations of the method, the method may further include causing the graphical indicator for each first stop position associated with one of the one or more first awards to update to indicate the associated first award responsive to (d).

In some implementations of the method, the method may further include causing a base game to be displayed on the one or more displays; causing a second bonus game to be displayed on the one or more displays, the second bonus game including a depiction of a second construct having a plurality of second stop positions, one or more of which may be associated with an opportunity to play the first bonus game; and causing, responsive to an outcome of the base game, a second stop position of the plurality of second stop positions to be selected. The selection of the second stop position may be one of the trigger events.

In some implementations of the method, the method may further include receiving a signal indicating a player input after the selection of the second stop position and the receipt of the signal indicating a player input may be another of the one or more trigger events that, in combination with the selection of the second stop position, cause (c) to occur.

In some implementations of the method, the method may further include resetting the associations of the first stop positions with the first and second awards to a default set of associations responsive, at least in part, to an award of one of the one or more first awards.

In some implementations of the method, the method may further include causing, responsive to an award of one of the one or more first awards, at least the first stop positions associated with that same first award to be reduced in number by at least associating one or more of them with one or more of the one or more second awards instead.

In some implementations of the method, the method may further include maintaining the association of each first stop position with the associated first or second award for that first stop position during play of a base game provided by the electronic gaming machine.

In some implementations of the method, the method may further include performing one or more instances of (c) during play of the first bonus game by a first player; performing one or more instances of (c) during play of the first bonus game by a second player that is the next player to play the first bonus game after the first player stops playing the first bonus game; and preserving the associations made in (d) during play of the first bonus game by the first player for play of the first bonus game by the second player.

In some implementations, a non-transitory, computer-readable storage device storing computer-executable instructions for controlling one or more processors to provide a wagering game on an electronic gaming system may be provided. The non-transitory, computer-readable storage device may store further computer-executable instructions for additionally controlling one or more processors to: (a) cause a first bonus game associated with one or more first awards and one or more second awards to be displayed on one or more displays of the electronic gaming system, the first bonus game including a depiction of a first construct having a plurality of first stop positions that are each associated with an award selected from the group consisting of: the first awards and the second awards (the first construct may include graphical indicators of each first stop position and of the award associated with each first stop position); (b)

receive an indication of one or more trigger events; (c) select one or more of the first stop positions responsive, at least in part, to receipt of each indication of one of the one or more trigger events; and (d) cause at least one of the one or more first stop positions that are selected in response to receipt of the indication of one of the one or more trigger events and are, at the time of such selection, associated with one of the one or more second awards to be associated with one of the one or more first awards instead.

In some implementations of the non-transitory, computer-readable storage device, each of the one or more first awards may be a jackpot award and each of the one or more second awards may be a non-jackpot award.

In some implementations of the non-transitory, computer-readable storage device, each of the non-jackpot awards may be a fixed credit amount, a multiplier bonus applicable in a primary wagering game of the electronic gaming system, one or more wild symbols applicable in the primary wagering game of the electronic gaming system, a free play of the first bonus game, a free play of a base game associated with the first bonus game, a free play of a second bonus game, an additional selection of one of the stop symbols, or a no-value award.

In some implementations of the non-transitory, computer-readable storage device, each of the one or more jackpot awards may be a progressive award, an award with a value selected from a set of one or more award values associated with the wagering game that are at least four times higher than a highest award value of the wagering game that is not in the set of one or more award values, or an award with a value selected from a set of one or more award values associated with the wagering game that are at least forty times higher than a highest award value of the wagering game that is not in the set of one or more award values.

In some implementations of the non-transitory, computer-readable storage device, the construct may be one or more wheels, one or more reels, one or more dice, or a grid-based treasure map.

In some implementations of the non-transitory, computer-readable storage device, the non-transitory computer-readable storage device may store further computer-executable instructions for further controlling one or more processors to: cause, responsive to one of the first stop positions associated with one of the one or more non-jackpot awards being selected, the non-jackpot award associated with that selected first stop position to be awarded to a first player; and cause, responsive to at least one of the first stop positions associated with one of the one or more jackpot awards being selected, the jackpot award associated with that selected first stop position to be awarded to the first player.

In some implementations of the non-transitory, computer-readable storage device, the non-transitory computer-readable storage device may store further computer-executable instructions for further controlling one or more processors to cause the graphical indicator for each first stop position associated with one of the one or more first awards to update to indicate the associated first award responsive to (d).

In some implementations of the non-transitory, computer-readable storage device, the non-transitory computer-readable storage device may store further computer-executable instructions for further controlling one or more processors to: cause a base game to be displayed on the one or more displays; cause a second bonus game to be displayed on the one or more displays, the second bonus game including a depiction of a second construct having a plurality of second stop positions and one or more of the second stop positions may be associated with an opportunity to play the first bonus game; and cause, responsive to an outcome of the base game, a second stop position of the plurality of second stop positions to be selected. The selection of the second stop position may be one of the trigger events.

In some implementations of the non-transitory, computer-readable storage device, the non-transitory computer-readable storage device may store further computer-executable instructions for further controlling one or more processors to receive a signal indicating a player input after the selection of the second stop position. The receipt of the signal indicating a player input may be another of the one or more trigger events that, in combination with the selection of the second stop position, cause (c) to occur.

In some implementations of the non-transitory, computer-readable storage device, the non-transitory computer-readable storage device may store further computer-executable instructions for further controlling one or more processors to reset the associations of the first stop positions with the first and second awards to a default set of associations responsive, at least in part, to an award of one of the one or more first awards.

In some implementations of the non-transitory, computer-readable storage device, the non-transitory computer-readable storage device may store further computer-executable instructions for further controlling one or more processors to cause, responsive to an award of one of the one or more first awards, at least the first stop positions associated with that same first award to be reduced in number by at least associating one or more of them with one or more of the one or more second awards instead.

In some implementations of the non-transitory, computer-readable storage device, the non-transitory computer-readable storage device may store further computer-executable instructions for further controlling one or more processors to maintain the association of each first stop position with the associated first or second award for that first stop position during play of a base game provided by the electronic gaming machine.

In some implementations of the non-transitory, computer-readable storage device, the non-transitory computer-readable storage device may store further computer-executable instructions for further controlling one or more processors to: perform one or more instances of (c) during play of the first bonus game by a first player; perform one or more instances of (c) during play of the first bonus game by a second player that is the next player to play the first bonus game after the first player stops playing the first bonus game; and preserve the associations made in (d) during play of the first bonus game by the first player for play of the first bonus game by the second player.

DETAILED DESCRIPTION

The subject matter of the present disclosure relates to systems and methods of electronic gaming, and more particularly, to systems and methods of electronic gaming that include a wheel-based bonus game, in which a bonus wheel may trigger a separate jackpot wheel. The jackpot wheel may include a plurality of stop positions, many of which may be associated with one or more credit prizes. When a player lands on a stop position associated with a credit prize, the credit prize may be awarded, and the credit prize previously associated with the stop position may be replaced by a jackpot award. In this respect, a credit prize associated with the stop position may "metamorphose" to a jackpot award. As gameplay progresses, the number of jackpot awards included on the jackpot wheel may increase, such that a player's odds of winning a jackpot award also increase. In addition, jackpot awards added to a jackpot wheel may persist over time irrespective of player gaming session, such that a subsequent player may win a jackpot award added during an earlier player's gaming session. Players are encouraged, as a result, to continue gameplay, once it has begun, until a jackpot award is won.

Figure 1:
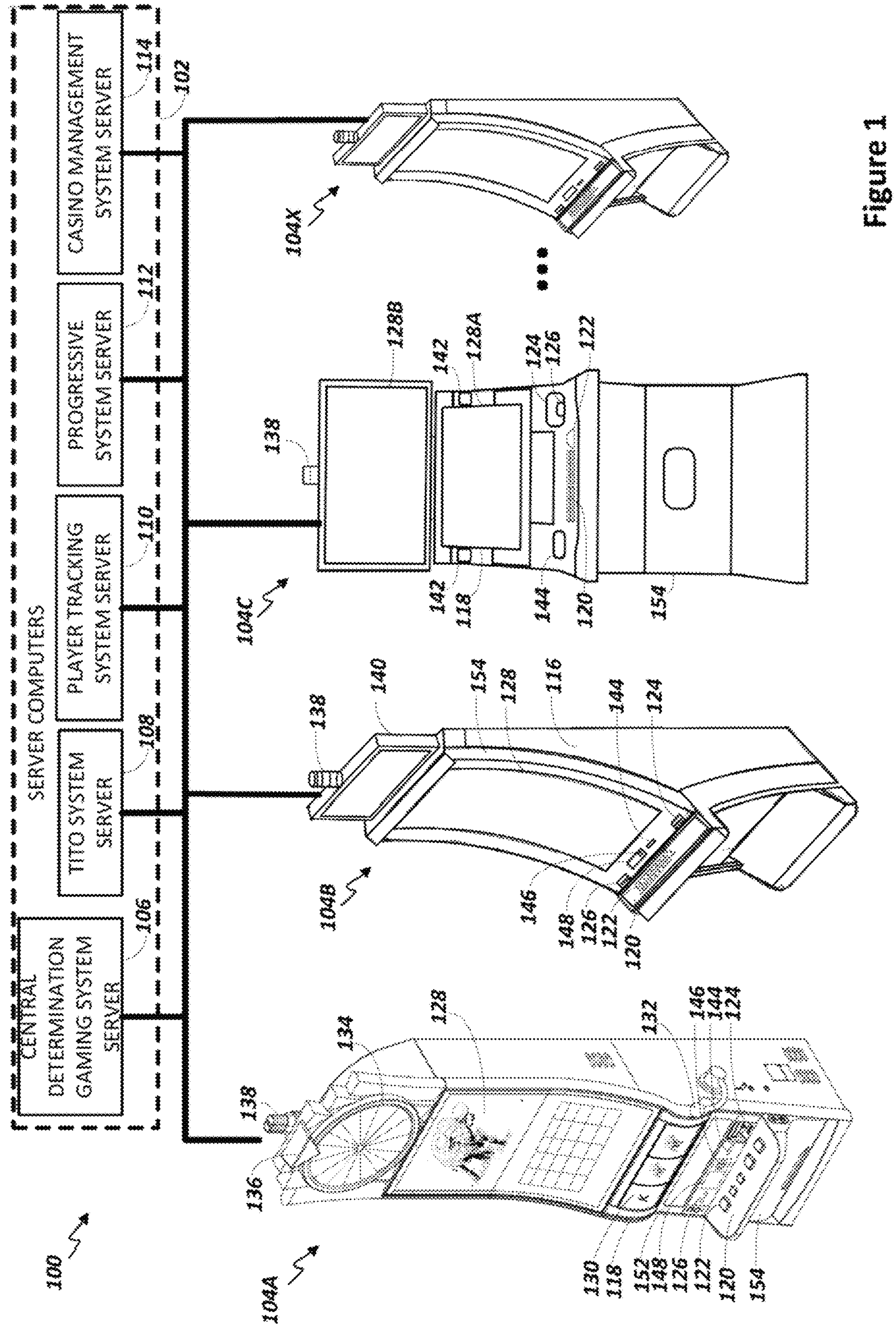
FIG. 1 is an exemplary diagram showing several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other implementations, the gaming devices 104A-104X may communicate with one another and/or the server computers 102 over RF, cable TV, satellite links and the like.

In some implementations, server computers 102 may not be necessary and/or preferred. For example, the present invention may, in one or more implementations, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X (which may be generically referred to herein as "gaming device" or "gaming machine" 104) may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 including a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A.

In some implementations, a player tracking card reader 144, a transceiver for wireless communication with a player's smartphone, a keypad 146, and/or an illuminated display 148 for reading, receiving, entering, and/or displaying player tracking information is provided in EGM 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2:
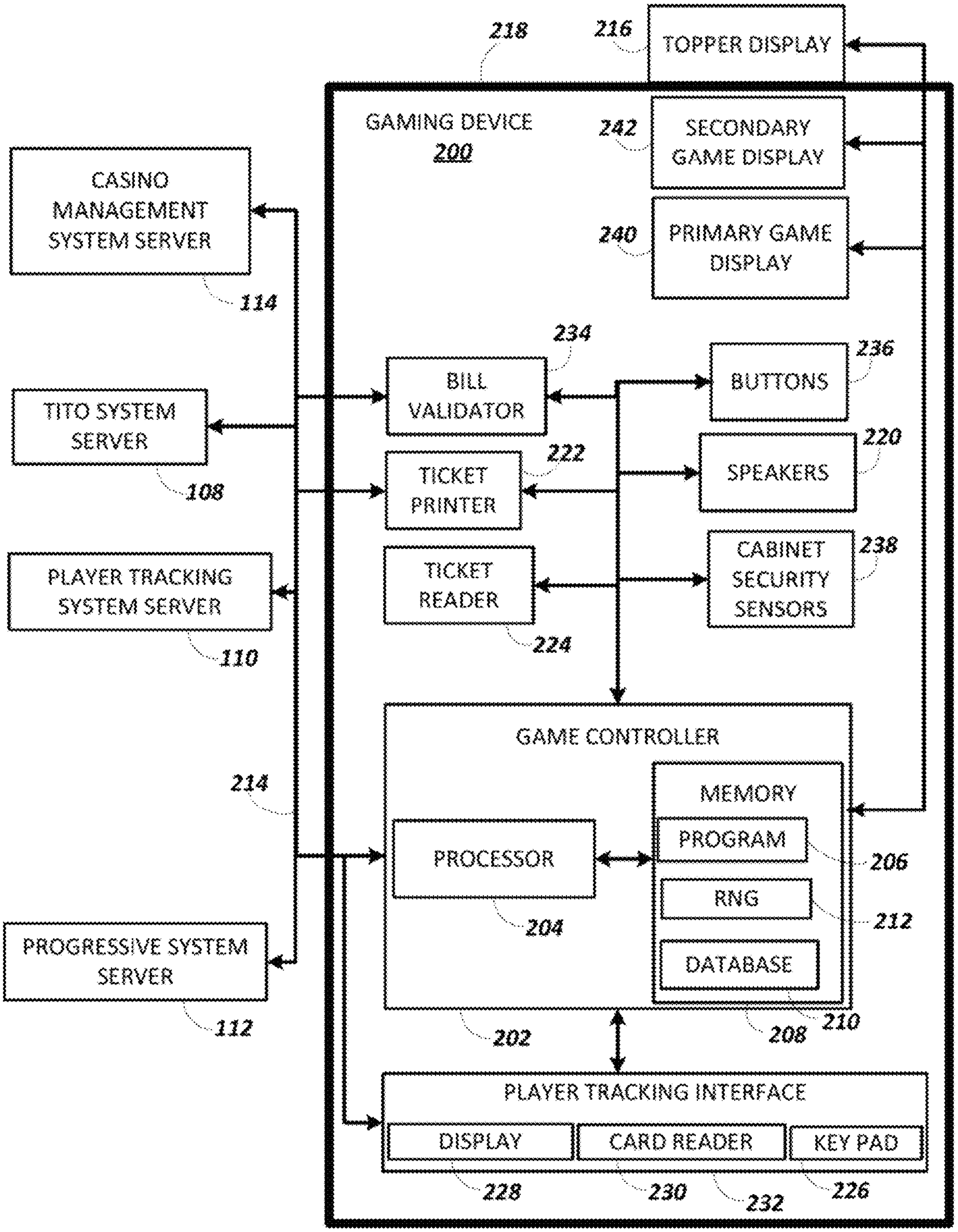
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing implementations of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some implementations, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that implementations of the present invention represent an improvement in the art of EGM software and provide new technology in that they provide bonus gameplay functionality that provide user-upgradeable bonus game features that increase player investment in playing a particular gaming machine and thereby maintain player interest. These implementations are thus not merely new game rules or simply a new display pattern.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Throughout this specification and in the claims, the terms "primary game" and "bonus game" refer to a game session that includes more than one game event or, simply, one or more games. The primary game may correspond to a primary or "base" game, as opposed to a bonus game, as described below. The primary game may be initiated in response to a wager or credit being received by or transferred to a gaming machine, such as gaming machines 104 (shown in FIG. 1). The primary game (as well as one or more games including the primary game) may also be initiated by other game events including, for example, a player selecting a "spin" button, a start button, a deal button, or any other such input selector designated for initiating a game session. The primary game may be terminated voluntarily in response to an input by the player indicating that the player wishes to stop the game or automatically by the gaming device in response to a termination event, such as a zero credit balance in the game.

Further, as used herein, the terms "bonus game," "secondary game," "bonus game session," and "bonus feature" refer generally to a game or a component of a game involving procedures in addition to the primary game. The bonus game may be initiated after, or during, the primary game and in response to a particular condition occurring during the primary game or, in some instances, in response to a particular condition occurring during another bonus game, e.g., events in a primary game may cause a bonus game to be provided to a player, and a subsequent event in the bonus game may cause a second bonus game to be provided to the player (it is conceivable that you could have any number of such tiered bonus games). The bonus game may include a plurality of bonus game events. For example, where the primary game includes a slot machine game, the bonus game may allow players a possibility of winning more than the pay table for the primary game indicates. Typically, a bonus game outcome may depend upon a particular symbol being displayed when one of a plurality of final game events takes place. In addition, the bonus game outcome may depend upon winning a payout while gaming machine 104 is in a bonus mode or "zone." In various implementation, the outcome of the bonus game may be unrelated to the outcome of the primary game.

Figure 3:
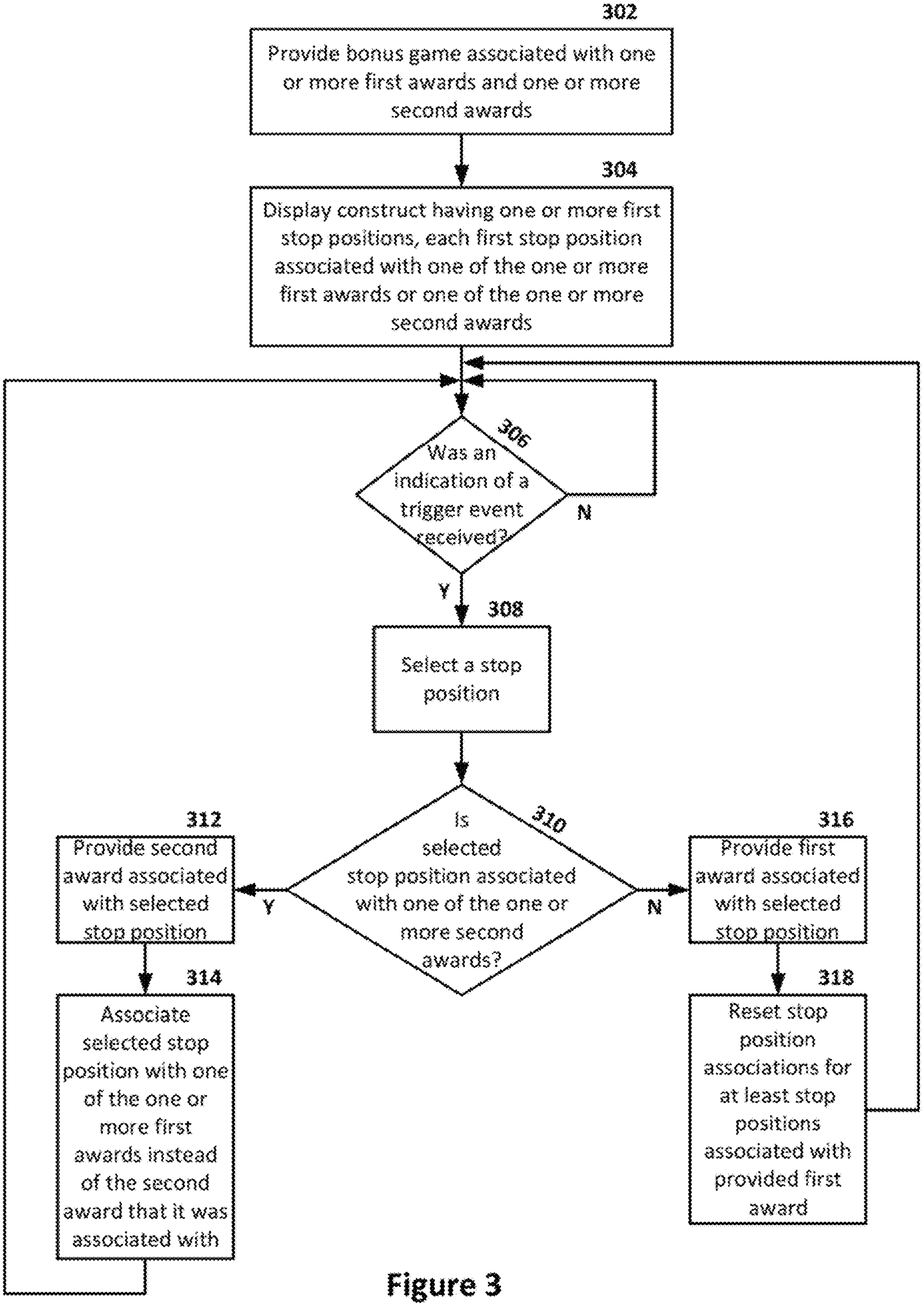
FIG. 3 is a block diagram of a technique for providing a bonus game in accordance with the concepts discussed herein.

FIG. 3 is a block diagram of a technique for providing a bonus game in accordance with the concepts discussed herein.

In block 302, a bonus game may be provided to a player of an electronic gaming machine. The bonus game may, for example, be any of a number of different types of bonus games in which a player is generally provided with a number of opportunities to win a prize in response to the determination of a random outcome. The bonus games in this example may generally be associated with one or more first awards and one or more second awards. The one or more first awards may generally be higher-value, more desirable awards than the one or more second awards—typically much higher in value than the one or more second awards. For example, the one or more second awards may be awards such as fixed-credit awards within an order or magnitude or so of the credit awards that are potentially awardable in the main game of the electronic gaming machine, and the one or more first awards may, for example, be multiple orders of magnitude larger than the credit awards that are potentially awardable in the main game of the electronic gaming machine, e.g., jackpot awards. For example, the one or more first awards may be progressive awards that grow in magnitude with every wager placed on the electronic gaming machine and, optionally, on other electronic gaming machines as well. The one or more second awards may also include, in some implementations, non-credit or no-value awards, including zero credit awards, i.e., awards that provide no actual benefit, and bonus features that may affect future play or current awards of the main game or of the bonus game. For example, such bonus features may include awards such as win multipliers, free games, wild cards or the like, and so forth.

In some implementations, the first awards may be understood to include jackpot awards such as monetary awards greater than a predefined threshold, monetary awards more than X orders of magnitude larger than a next highest, lower-amount award of the awards, and progressive awards. For example, in some implementations, a jackpot award may be between 4× to 40× (or higher) in value as compared with non-jackpot awards available in a wagering game. In some implementations, there may be multiple, different-valued jackpot awards. For example, there may be a set of one or more jackpot award values available in a wagering game (and/or, in some cases, a bonus game associated therewith) that each have a value that is between 4× to 40× (or higher) than a highest award value available in the wagering game that is not included in the set of one or more jackpot award values. For example, a wagering game might offer award values of 1, 2, 5, 10, 15, 20, 25, 30, 40, 50, 100, 500, 1000, and 10,000 credits; the 500, 1000, and 10,000 credit amounts may be classed as "jackpot" awards since they are each higher than 4× the amount of the highest award value not in the "jackpot" set (which is 100 credits).

Similarly, the second awards may be understood to include, in some implementations, non-jackpot awards, e.g., fixed credit amount awards below a predefined threshold, multiplier bonus awards applicable in a primary wagering game of the electronic gaming system, one or more wild symbols applicable in the primary wagering game of an electronic gaming system, a free play of a bonus game (either the bonus game discussed above, or a different bonus game), a free play of a base game associated with the bonus game, an additional selection of one of the stop symbols, addition of an additional reel window, or no-value awards.

In block 304, a construct may be caused to be displayed. The construct may, for example, be a graphical object or objects that represents a physical object or objects that has one or more stop positions, each of which is associated with one of the one or more first awards or the one or more second awards. For example, each stop position may have an indication depicted thereon or therein that indicates the nature of the award associated with that stop position. The stop positions may, for example, each represent an opportunity to obtain an associate outcome—for example, in a wheel-based bonus game, each stop position may be a wheel segment extending across a predefined angular range, e.g., a "pie-slice." In a reel-based bonus game, each stop position may, for example, be a different reel position or reel stop. When the bonus game is initiated or reset to a "fresh" state, the number of stop positions associated with the one or more first awards maybe set to a relatively low value as compared with the number of stop positions associated with the one or more second awards. For example, there may initially be only one (or perhaps zero) stop positions associated with the one or more first awards, whereas there may be a much larger number of stop positions associated with the one or more second awards. For example, a typical bonus game may have upwards of 10 to 15 or more stop positions associated with the one or more first and second awards, and the vast majority of those stop positions may be associated with the one or more second awards.

In some implementations, the bonus game may be caused to be displayed continuously, e.g., in a secondary display of the gaming machine and during the play of the main game, so that the player may be aware of the potential opportunity to play the bonus game, whereas in other implementations, the bonus game may be hidden from view or minimized to a reduced format during play of the main game (when the bonus game is not actively being played)—although the state of the bonus game may generally be preserved or otherwise have permanence between plays of the bonus game punctuated by plays of the main game in such implementations.

In block 306, monitoring for an indication of a trigger event may be performed—such trigger event indications may, for example, include events such as the selection of a predefined symbol or outcome in a base game or another bonus game, winning of a threshold amount in the main game or another bonus game, winning a "free play" award in the bonus game itself, or other trigger event. If an indication of a trigger event is not detected in block 306, the technique may return to block 306 for further monitoring. If a trigger event is detected in block 306, then the technique may proceed to block 308, in which an outcome for the bonus game governing which stop position is selected may be determined. The display of the construct may be modified during this process to show an animation, e.g., to show a rotating wheel or reel that concludes with the selected stop position indicated. For example, for a wheel-type construct, the construct may include a pointer or other indicator that may point to the segments (stop positions) of the wheel as it rotates and, when the wheel stops, indicates the selected segment (or stop position). It should be understood that while the examples discussed herein typically feature a construct in which the stop positions move during play in order to cause a particular stop position to be positioned at a location associated with selection of a stop position, other implementations may feature stop positions that are stationary. For example, a wheel-type construct may be fixed in place such that the orientations of the various wheel segments do not change during a wheel "spin" (in other words, the wheel does not actually spin); in such implementations, the "spinning" may be indicated by sequentially changing the color or brightness of the segments, or otherwise emphasizing particular segments, in a clockwise or counterclockwise manner around the center of the wheel. Alternatively, a pointer located at the periphery of the wheel may be animated so as to traverse around the outer perimeter of the wheel and stop when indicating the selected stop position.

In block 310, a determination may be made as to whether the selected stop position is associated with one of the one or more first awards or one of the one or more second awards. It will be understood that such a determination may be made before the selected stop position is selected in some implementations. For example, block 308 may involve selecting an outcome, e.g., a win of a second award, and the display of the construct may then be controlled to cause a stop position associated with that outcome to be selected.

If the selected stop position is associated with one of the one or more second awards, the technique may proceed to block 312, in which the second award associated with the selected stop position may be provided to the player, e.g., if the associated second award is a credit amount, then that credit amount may be added to the player's credit balance.

After a stop position that is associated with one of the one or more second awards is selected, the technique may further proceed to block 314, in which the selected stop position is associated with one of the one or more first awards instead of the second award it was previously associated with. Thus, for example, if a stop position associated with a second award that provides a $5 credit is selected, the $5 credit may be provided to the player, and the selected stop position may then be associated with a first award, e.g., a jackpot award. The construct may be updated to reflect this change, e.g., an indicator saying "5 credits" may morph or otherwise change into an indicator saying "Jackpot!" or the like. In some implementations, stop positions that were associated with a second award and are then changed to be associated with a first award after the associated second award is won may be portrayed in a different manner than other stop positions that were already associated with a first award prior to the selection of the most recently selected stop position. For example, a stop position that is newly associated with a first award may have the indicator of the first award shown in a "greyed out" manner (compared to colored indicators shown for other stop positions previously associated with first awards) or have text like "New!" displayed thereon. Such implementations may avoid circumstances where a player believes that they won a first award because the indicator for the second award that they just won has changed into an indicator of an associated first award while the stop position is still selected—in such circumstances, it may be desirable to retain the ability to differentiate between stop positions that were associated with first awards prior to the most recent selection of a stop segment and a stop position that was newly associated with a first award after the most recent selection of a stop segment.

After the selected stop position previously associated with a second award is re-associated with a first award, the technique may return to block 306, where monitoring of trigger events continues. For example, after a player wins a second award due to the selection of a stop position associated with the second award and after the selected stop position is then newly associated with one of the one or more first awards, play of the bonus game may stop, and the player may be returned to the base game or another bonus game. As the player plays the base game or another bonus game, a further trigger event may occur, which may cause play of the bonus game associated with the one or more first awards and one or more second awards to begin again. Generally speaking, the stop positions that were previously associated with a second award but then re-associated with a first award, as described above, may remain associated with those first awards when play of the bonus game begins again after a further trigger event is detected. Thus, each time the player plays the bonus game and wins a second award, the number of stop positions associated with the one or more first awards may be increased by one—thereby increasing the player's chances of winning a first award on a subsequent play of the bonus game. It will be understood that the apparent chances of achieving a particular outcome may, in some implementations, not actually reflect the actual chances of achieving that particular outcome. For example, 75% of the stop positions (assuming equal-sized stop positions) for a given bonus wheel may be associated with a particular outcome, but the behavior of the bonus wheel may be governed such that the actual chance of achieving that outcome is less than 75%. In such cases, however, increasing the number of stop positions associated with a particular outcome will still generally cause the chance of achieving that particular outcome to increase compared to its previous value. In an extreme case, the visual appearance of achieving a particular outcome may appear to change due to an increased number of stop positions associated with that particular outcome, but the actual chance of achieving that particular outcome may be controlled so as to remain static, i.e., unchanged.

If the selected stop position is associated with one of the one or more first awards then the technique may proceed to block 316 instead, in which the gaming machine may cause the first award associated with the select stop position to be provided to the player, for example, by causing an associated number of credits to be awarded to the player. In some implementations, the technique may then proceed to block 318, in which the stop positions associated with the first award that was provided to the player may be reset to a default state. For example, such a reset may involve re-associating with second awards any stop positions that were originally associated with second awards and then subsequently associated with first awards due to the second awards for those stop positions being won during play of the bonus game. For example, if six stop positions were changed from being associated with second awards to being associated with first awards during play of the bonus game, then those six stop positions may be returned to being associated with second awards after the first award is won. In some implementations, such resets may be position-specific, e.g., exactly the same stop positions that were re-associated to a first award during play are reset to being associated with second awards, whereas in other implementations, such resets may be position-neutral, e.g., if six of seven stop positions were re-associated to a first award during play of the bonus game, then any six of those seven stop positions, may be reset to be associated with a second award. In some implementations, a reset of stop positions may entail decreasing the number of stop positions associated with a first award by associating them with a second award.

It will be understood that bonus games such as are described herein may, in some implementations, have a plurality of different types of first awards and second awards that are associated with the stop positions of the bonus game. For example, a bonus game may initially feature two stop positions that are each associated with a different first award, e.g., a fixed jackpot award and a progressive jackpot award (which may continue to increase over time). Similarly, the bonus game may feature multiple stop positions that are each initially associated with one of several second awards, e.g., $1, $2, $5, $10, etc. credit awards. When a stop position is selected that is associated with one of the second awards, it may then be associated with one of the two jackpot awards in this example for future play. The determination of which of the two jackpot awards to associate with the selected stop position may be made randomly or according to one or more rules governing such associations. For example, stop position association with multiple first awards may occur in an alternating or sequential fashion so that the increases in the number of stop positions associated with each first award occur generally in sequential lockstep. In other implementations, the specific first award that is associated with a selected stop position may be determined based on the nature of the second award that was previously associated with the selected stop position, e.g., stop positions associated with higher-value second awards may be associated with a higher-value first award, and stop positions associated with lower-value second awards may be associated with lower-value first awards.

FIGS. 4A through 4J depict a bonus game according the concepts discussed herein in various stages of operation. In FIGS. 4A through 4J, a bonus wheel is depicted that initially has one stop position (shaded for easy reference) that is associated with a first award (a "Jackpot" award in this example) and seventeen stop positions that are each associated with, in this case, a different second award (other implementations may use only one type of second award, or may use multiple second awards but allow multiple stop positions to be associated with the same second award). The second awards, in this example, are fixed credit amounts. In this example, each play of the bonus game involves spinning the wheel and then seeing which stop segment lines up with the triangular selection indicator located at the top of the wheel when the wheel comes to a stop.

Figure 4A:
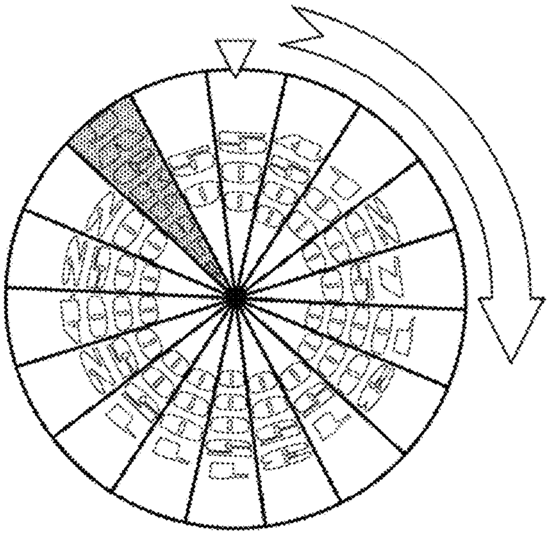
FIGS. 4A through 4J depict a bonus game according the concepts discussed herein in various stages of operation.
Figure 4B:
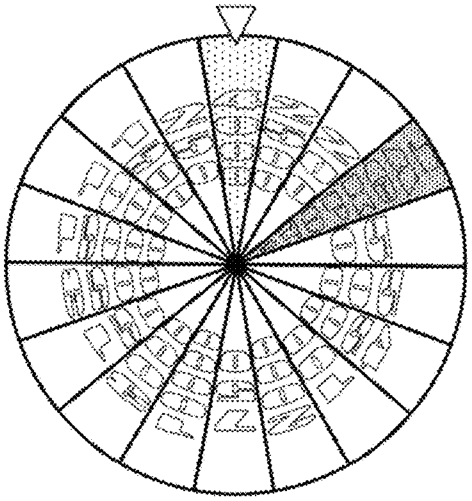
Figure 4C:
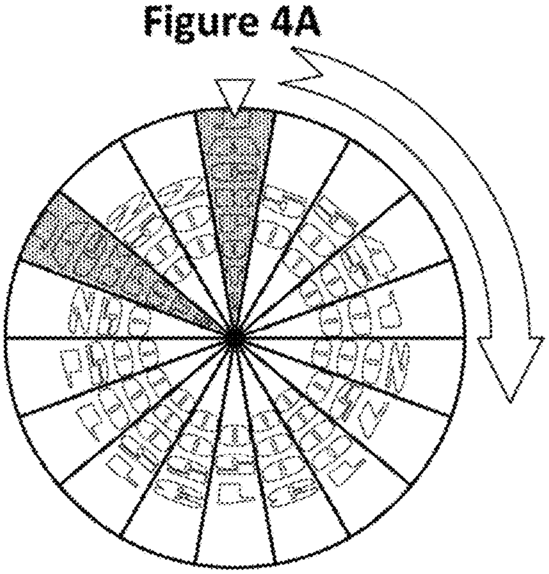
Figure 4D:
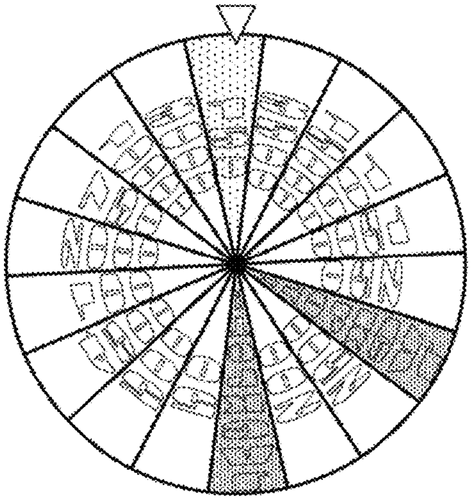
Figure 4E:
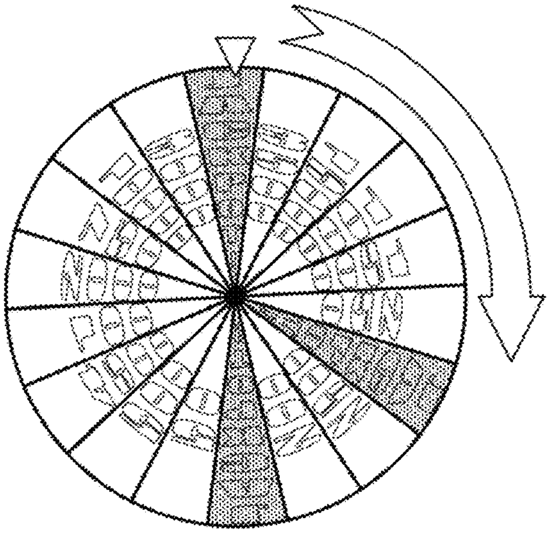

In FIG. 4A, the wheel is spun and, in FIG. 4B, comes to a stop such that a stop position for 4000 credits is selected. The player receives 4000 credits, and the selected stop position is then associated with the first award, as can be seen in FIG. 4C. In a subsequent spin of the wheel, e.g., after another trigger event occurs and as shown in FIG. 4C, another stop position associated with a second award may be selected, as is shown in FIG. 4D. In FIG. 4D, the stop position associated with a second award of 150 credits has been selected and is then re-associated with the Jackpot award responsive to such selection. At this point, there are three of eighteen stop positions associated with the first award and the chances of winning the first award have tripled compared to the initial chances of doing so.

Figure 4F:
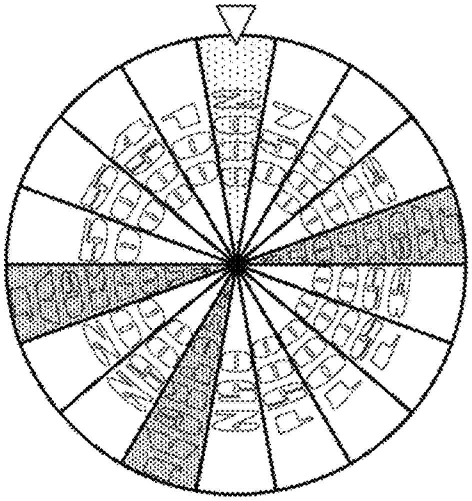
Figure 4G:
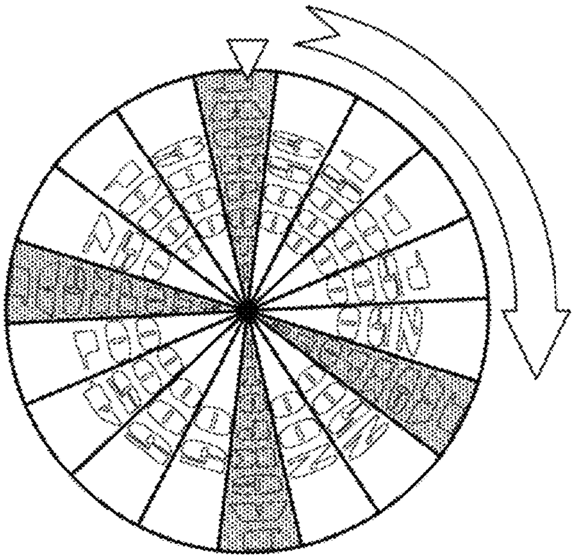
Figure 4H:
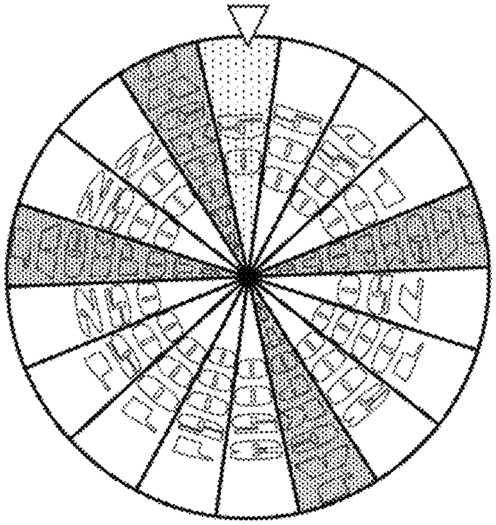
Figure 4I:
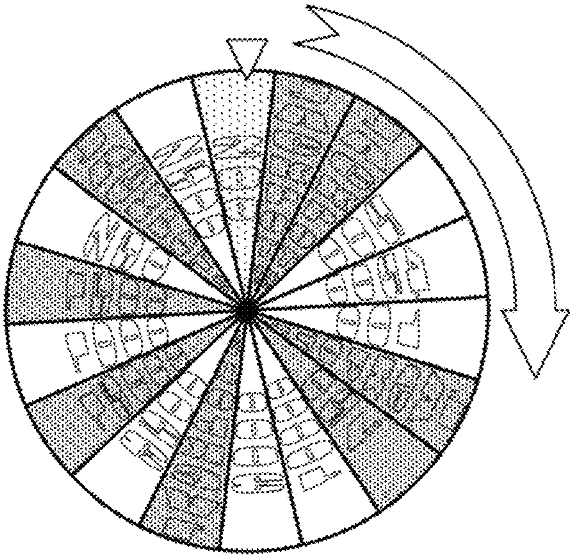
Figure 4J:
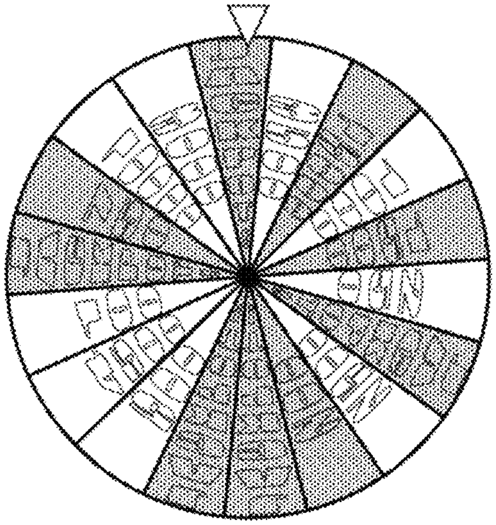

In FIG. 4E, the wheel is spun again (in response to detection of another trigger event), and the stop position for 2000 credits is selected in FIG. 4F; the selected stop position is then associated with the first award for further play. In FIG. 4G, a further spin of the wheel during further play of the bonus game results in the selection of a stop position for a 50-credit second award, after which the selected stop position is associated with the first award. This general mode of operation may continue until the wheel is spun, as in FIG. 41, and a stop position associated with the first award is selected, as in FIG. 4J. In this example, the player has finally won the Jackpot after 50% of the wheel stop positions have been associated with the first award.

Figure 5A:
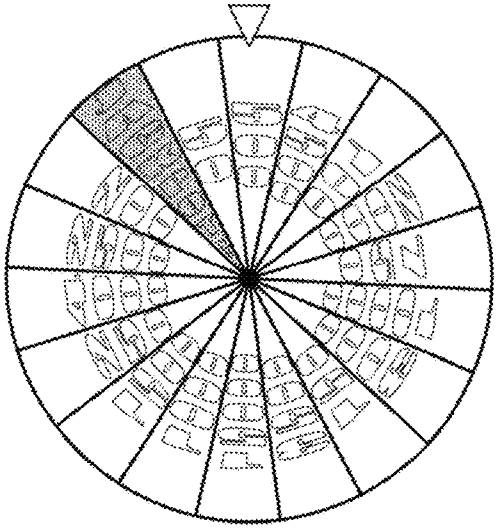
FIGS. 5A through 5D depict various examples of constructs that may be used in bonus games according to the concepts discussed herein.
Figure 5B:
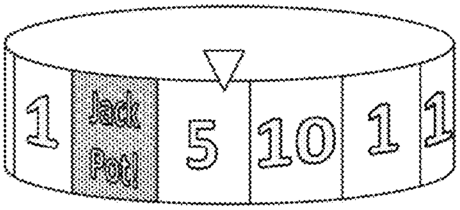
Figure 5C:
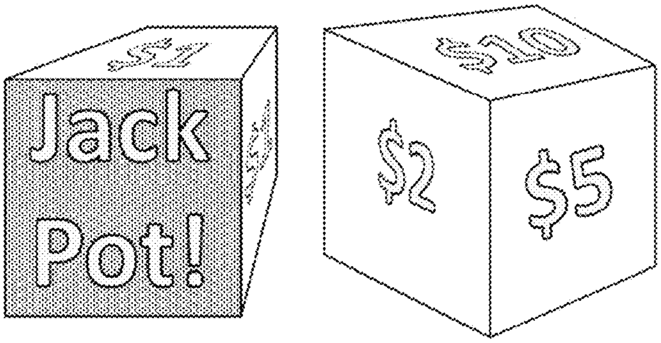
Figure 5D:
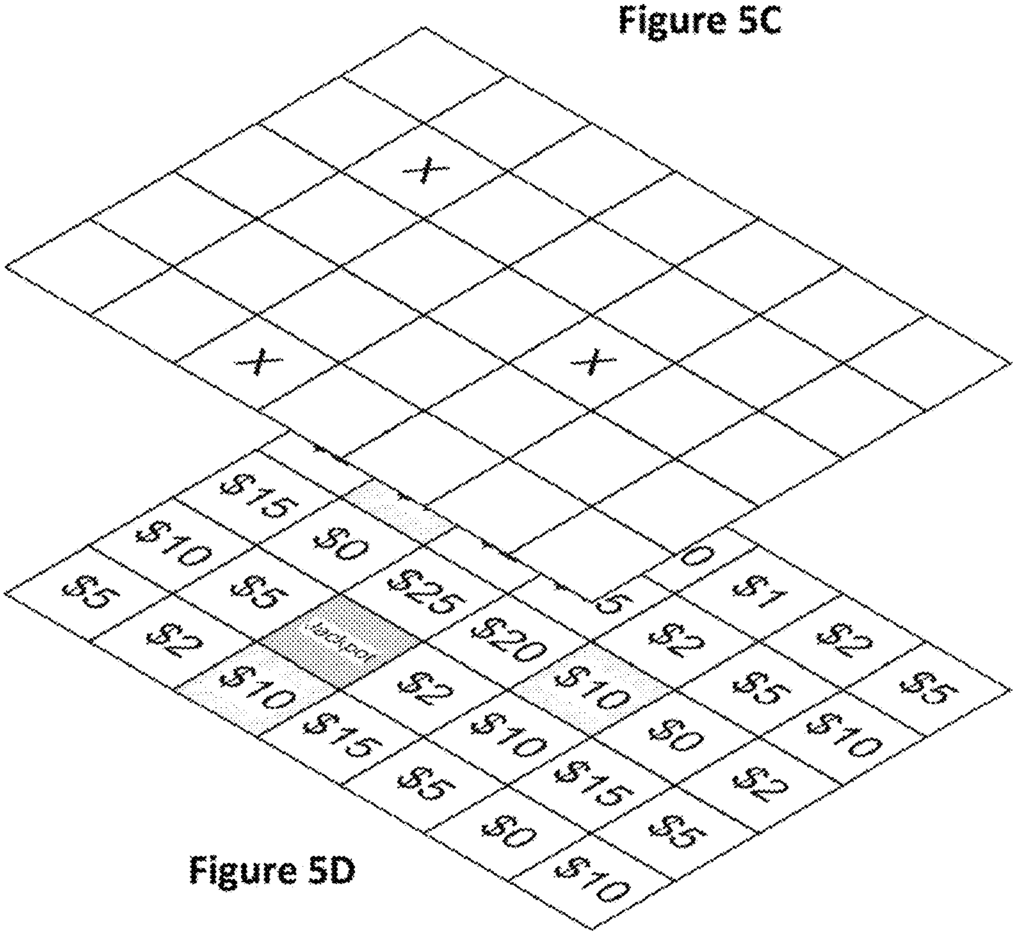
Figure 6:
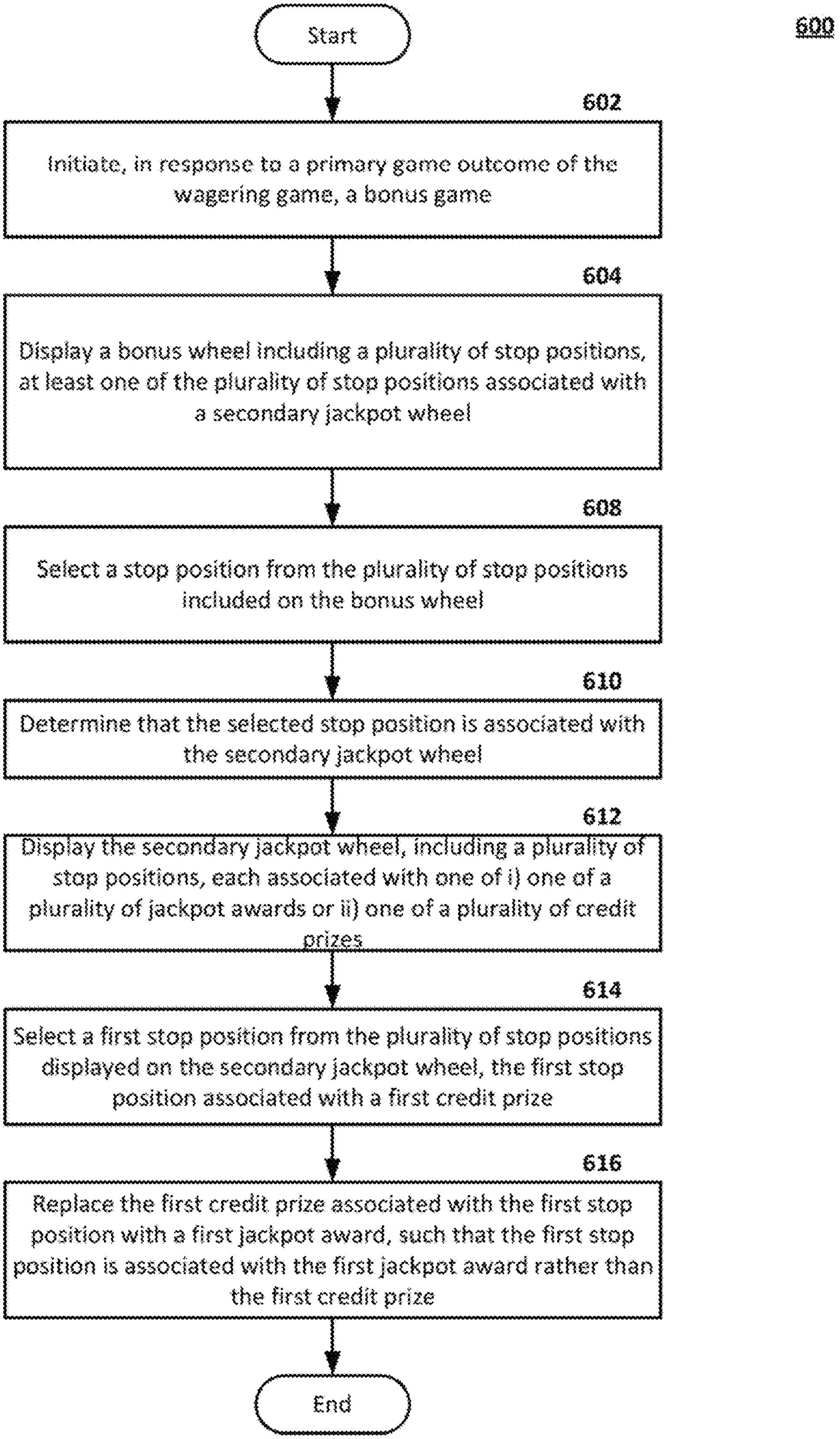
FIG. 6 is a flowchart illustrating an example process for playing an electronic game including a wheel-based bonus game.

It will be understood that the techniques discussed above may be employed using constructs other than wheels, such as are discussed above with reference to FIGS. 4A through 4J and as is shown in FIG. 5A. FIGS. 5B through 5D depict various additional examples of constructs that may be used in bonus games according to the concepts discussed herein.

In FIG. 5B, a reel-type construct is shown—in many respects, the reel construct is similar to the wheel construct in that the stop positions are distributed about its circumference and it rotates so that a particular stop position may be selected, e.g., by being indicated by the triangular indicator, based on where the reel stops. In contrast to the wheel-type constructs, such as in FIG. 5A, reel-type constructs do not have all of the stop positions visible at once, which may be less appealing to players since they will not be immediately able to tell how many of the stop positions are associated with the first award(s)—such information is only revealed when the reel rotates, and even then, stop positions that were previously visible may be hidden from view as the reel rotates.

In FIG. 5C, a dice-type construct is shown. The dice (it will be understood that more or less than two dice may be used, as well as dice with different numbers of sides) may be "rolled" during play of the bonus game, and each side or facet of each die may be associated with a first award or a second award. In such bonus games, a plurality of stop positions may be selected responsive to a trigger event, e.g., a stop position from each die may be selected (in this example, the uppermost faces of the dice may indicate the selected stop positions), and used to determine a bonus game outcome. In such bonus games, awarding the first award may be contingent on a particular multiple stop position outcome, e.g., each selected stop position resulting from a given trigger event may need to be associated with a first award (or, in some implementations, with the same first award) for the first award to actually be awarded. In other implementations, only a proper subset of the selected stop positions may need to be associated with a first award in order for the gaming machine to award the player with the associated first award.

For example, if the dice are "rolled" and one die shows a selected stop position associated with a first award, and the other shows a selected stop position associated with a second award, the stop position associated with the first award may effectively be ignored for that play of the bonus game, and the stop position associated with the second award may be treated in the same manner as discussed above, e.g., by awarding the second award and then associating the selected stop position associated with that second award with one of the one or more first awards instead.

Other scenarios that may occur for such multi-stop-position selection bonus games may include, for example, situations in which multiple stop positions are selected that are associated with either a first award or a second award. For example, if the dice of FIG. 5C are "rolled," in some instances, stop positions may be selected that are associated with two different second awards. In some implementations, the gaming machine may be configured to award to the player each second award associated with the selected stop positions for a given bonus game play. Thus, for example, if the selected stop positions for the depicted dice both indicate second awards, e.g., a 1-credit award and a 5-credit award, then the player may be awarded 6 credits. In some alternative implementations, the gaming machine may be configured to pick only one of the second awards associated with the selected stop positions and award it to the player. The determination of which second award to award to the player may be made randomly or according to a preset rule, e.g., the lowest second award selected may be awarded (or, conversely, the highest).

With regard to post-selection association of the stop positions with one or more of the first awards, a similar approach may be taken. For example, if the selected stop positions indicate multiple different first awards, the gaming machine may, in some implementations, be configured to randomly select a single one of those first awards to award to the player. Such selection may proceed in a manner similar to the possible techniques discussed above with respect to the second awards.

FIG. 5D depicts a diagram of a "grid" or "treasure map" type construct. In such constructs, the player may be presented with a play area, e.g., a grid or map (in FIG. 5D, this area is represented by the upper 5×7 grid of squares), that is divided into a large number of different regions (35 in this example); these regions may be thought of as equivalent to the stop positions discussed earlier. One or more of the regions is then selected by the player during play of the bonus game; in this example, there are three regions selected, each marked with an "X." Each of the regions is also associated with a first award or a second award—the player, however, will not know in advance what the award associations of the regions are. After the player selects the permitted number of regions, the grid display may be updated to show which awards each region was associated with and a determination may be made as to which awards are associated with the selected regions (or stop positions). In this respect, grid or treasure map bonus games may function in a manner similar to that described above.

One key difference between grid- or treasure map-type bonus games and the previous types of bonus games discussed in FIGS. 4A through 4C is that the player may have the ability to actively select the selected stop positions, whereas the other implementations feature random selection of stop positions. In view of this, grid- or treasure map-type bonus games may randomize the associations of the stop positions with the first and second awards prior to each play so that the player does not simply select the most desirable stop positions as revealed during previous plays of the bonus game. In such gaming machines, the total number of regions associated with each type of first award and/or second award prior to such randomization may be retained and the actual associations between those awards and the regions may then be controlled so as to preserve the same relative proportions of each. Thus, if a player has managed to re-associate regions or stop positions of the 35 regions shown in FIG. 5D so that there are a total of 9 stop positions associated with a first award, then the next play of the bonus game would also feature 9 stop positions associated with the first award, but their locations within the grid would be randomized.

In some similar implementations, the selection of the regions/stop positions may be randomly determined by the gaming machine (as opposed to selected under human control). In some such implementations, the associations of regions or stop positions with their respective first or second awards may generally be left unchanged prior to each play of the bonus game (the exception being stop positions that were re-associated from second awards to first awards as a result of the most recent selection of a stop position). In such implementations, the associations of the stop positions with their respective first and second awards may be made visible to the player prior to the selection of stop positions, as the player would not be in a position to benefit from such knowledge.

In FIG. 5D, three stop positions have been selected during play of the bonus game, all of which are associated with second awards (two $10 awards and a $1 award (not visible). There is only one stop position associated with a first award (the one marked "Jackpot"). However, during the next play of the bonus game there will be between one and three additional regions, i.e., one or more of the selected "X" regions, that are also associated with a first award.

The above are high-level descriptions of various types of bonus games that may benefit from the concepts described herein. Such bonus games may prove particularly attractive to players since the longer a player plays a gaming machine offering such a bonus game, the more "upgraded" the bonus game will be and the more likely it is that the player will win one of the first awards. A player who has invested significant time in "upgrading" a bonus game of a gaming machine may be more willing to continue playing the gaming machine to avoid losing their investment of time and credits in the gaming machine. The Figures discussed below illustrate a particular implementation of a gaming machine employing some of the concepts discussed herein.

With attention now to FIGS. 6-11, an example process 600 of electronic gaming is shown in conjunction with a plurality of screenshots 700, 800, 900, 1000, and 1100. Processor 60 (shown in FIG. 2) may implement process 600 as part of a bonus game, which may be triggered or initiated as a result of a primary game outcome (as described above).

Figure 7:
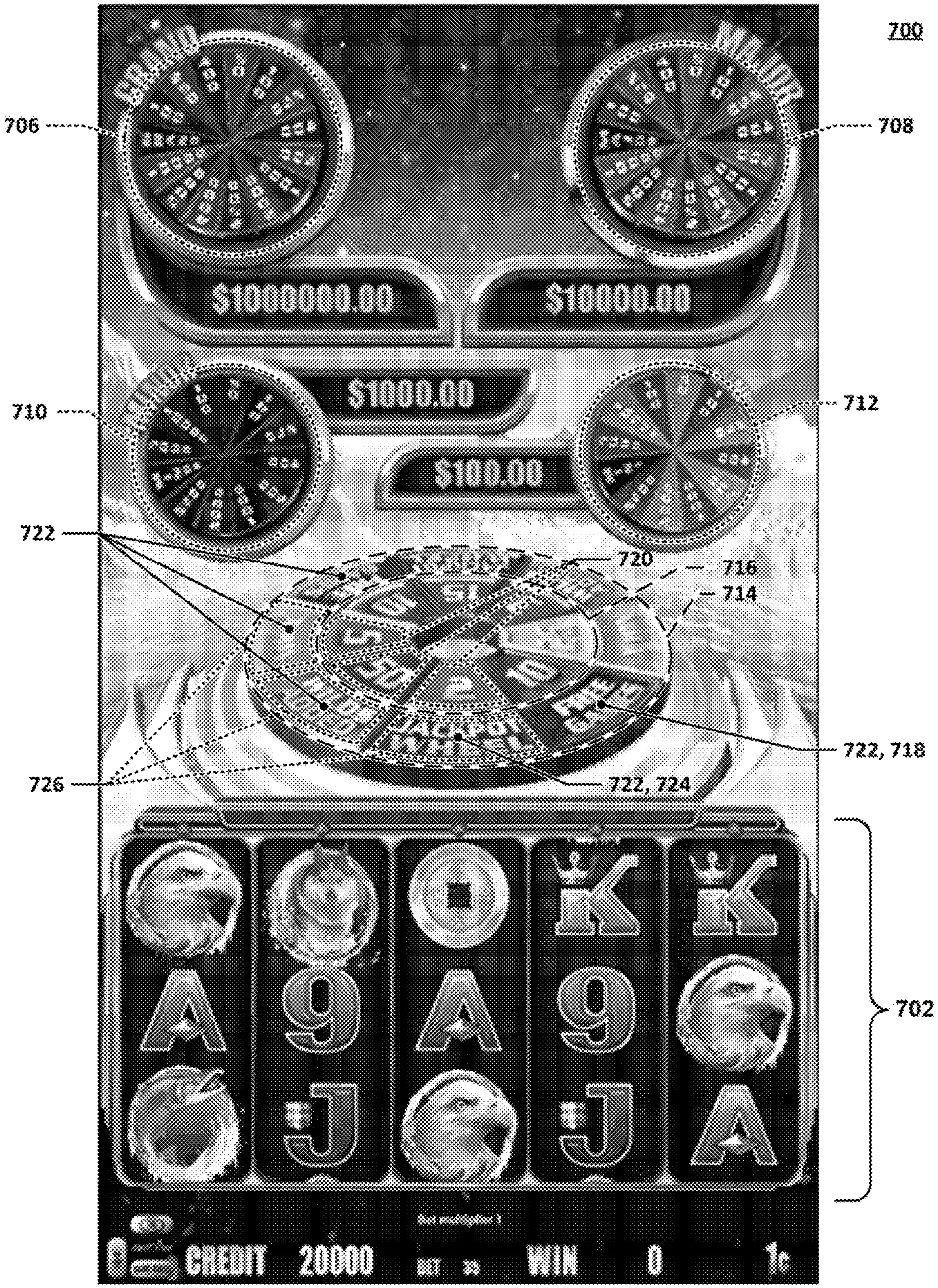
FIG. 7 is a screenshot of an example wheel-based bonus game, in which a bonus wheel is displayed, and in which a plurality of available secondary jackpot wheels are displayed.

Accordingly, and with specific reference to FIG. 7, processor 60 may initiate a bonus game 701, such as a wheel-based bonus game, in response to a primary game outcome of a primary game 702 (step 602). Primary game 702 may include any suitable primary game, such as a five-reel primary game. In addition, a bonus wheel 704 and a plurality of secondary jackpot wheels, such as a first jackpot wheel 706, a second jackpot wheel 708, a third jackpot wheel 710, and/or a fourth jackpot wheel 712 may be displayed in conjunction with primary game 702.

Bonus wheel 704 may include an inner bonus wheel 716 and an outer bonus wheel 714, each of which may spin independently. However, in other implementation, inner bonus wheel 716 and outer bonus wheel 714 may spin together. In the example implementation, inner bonus wheel 716 includes a plurality of credit prizes arranged within a plurality of inner bonus wheel segments or stop positions 720. Similarly, outer bonus wheel 714 includes a plurality of bonus game features 722, such as a jackpot wheel feature 724 or free games feature 718, arranged within a plurality of outer bonus wheel segments or stop positions 726.

Each of jackpot wheels 706-712 may be associated with a corresponding bonus game and displayed during primary game 702, and each jackpot wheel 706-712 may be related to (and configured to award) a specific bonus game, such as for example, a specific jackpot. In the example implementation, jackpots may include a "GRAND" jackpot, a "MAJOR" jackpot, a "MINOR" jackpot, and a "MINI" jackpot. However, in other implementations, any other suitable bonus and/or jackpot may be included. In addition, although the terminology "jackpot wheel" is used herein, it will be appreciated that jackpot wheels 706-712 may, in various implementations, be associated with a variety of bonuses. Thus, in the contemplated example, play of the base game may provide a player with an opportunity to play the bonus wheel game, which may, depending on the outcome of the bonus game, allow the player to play a further bonus game in the form of one of the four jackpot wheel bonus games—the jackpot wheel bonus games in this example operate in the manner discussed previously, as will become evident from the following discussion.

Further, in various implementations, each of the bonuses and/or jackpots (e.g., the GRAND, MAJOR, MINOR, and MINI jackpots) may be associated with a specific bonus and/or jackpot value. For example, a GRAND jackpot may be associated with a largest jackpot value, and a MINI jackpot may be associated with a smallest jackpot value. The MAJOR and MINOR jackpot values may fall between the GRAND jackpot value and the MINI jackpot value, such that the MAJOR jackpot value is greater than the MINOR jackpot value but less than the GRAND jackpot value. Similarly, the MINOR jackpot value may fall between the MAJOR jackpot value and the MINI jackpot value.

Figure 8:
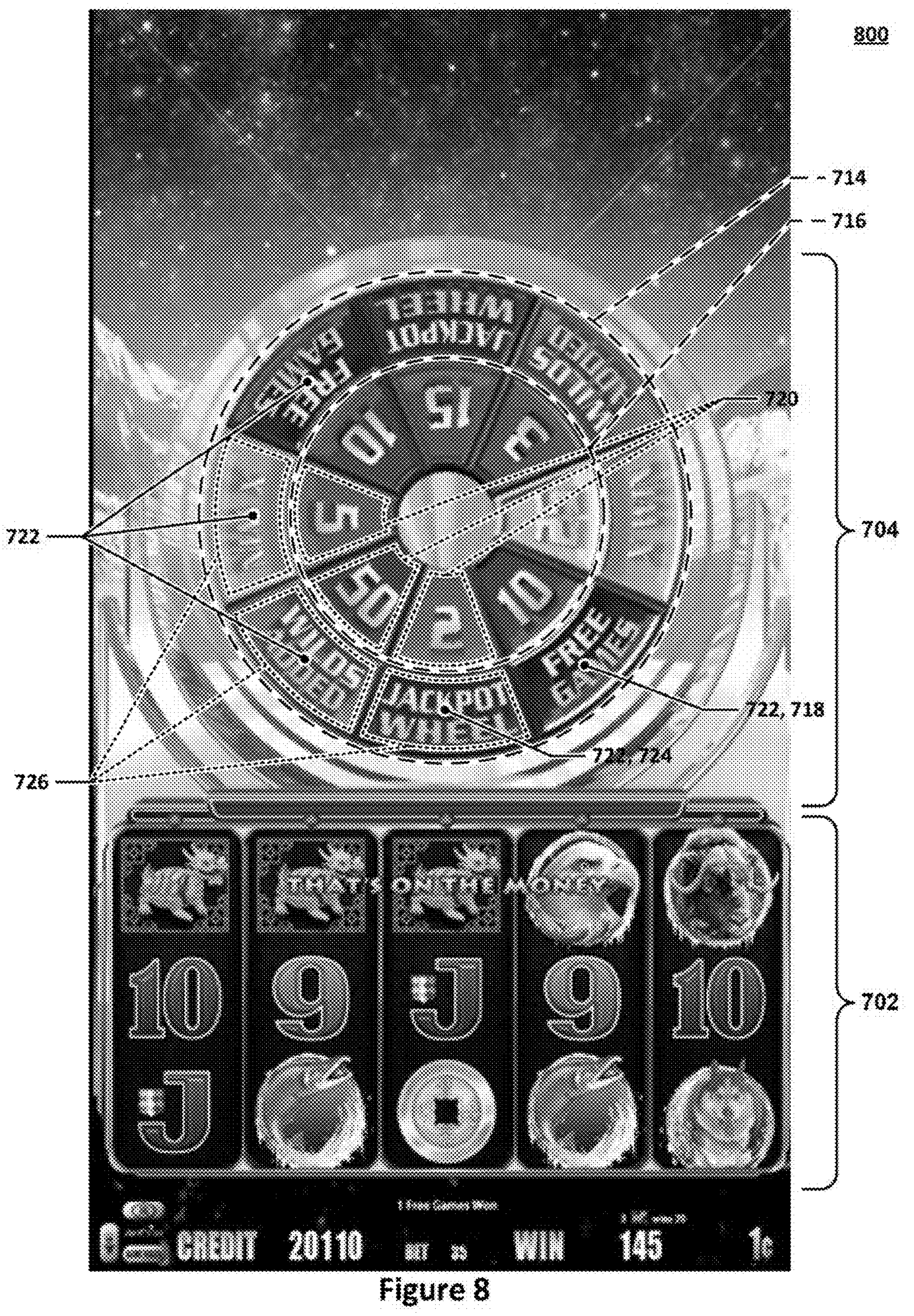
FIG. 8 is a screenshot of the wheel-based bonus game shown at FIG. 7, in which the bonus wheel is triggered based upon a base game outcome.

With reference now to FIG. 8, processor 60 may display bonus wheel 704 in response to initiation of bonus game 701 (step 604). More particularly, processor 60 may bring bonus wheel 704 to the foreground and/or enlarge bonus wheel 704 to add an element of excitement to bonus game 701. Processor 60 may, in addition, remove jackpot wheels 706-712 from view, such as, for example, to accommodate presentation of an enlarged bonus wheel 704.

To play bonus game 701, a player may select an option (not shown) presented in conjunction with bonus game 701, such as a "spin" option, which, in response to selection by the player, may cause bonus wheel 704 to spin. More particularly, either or both of inner bonus wheel 716 and/or outer bonus wheel 714 may spin (e.g., wheels may be animated by processor 60 such that they appear to spin on a video display) in response to selection of the "spin" option. Processor 60 may, in addition, select a particular stop position 720 from inner bonus wheel 716 and/or a particular stop position 726 from outer bonus wheel 714, such as in response to selection by a player of the "spin" option (step 606).

Selections on inner bonus wheel 716 may result in a variety of credit prizes and/or different numbers of free games. For example, a credit prize and/or free game may be awarded by processor 60 based on a selection, by processor 60, of a particular stop position 720 from inner bonus wheel 716. These credit prizes and/or free games may, in addition, be supplemented by an award feature, such as a "Wilds Added" award feature selected from outer bonus wheel 714. Thus, in the example implementation, a player may be awarded a first bonus prize or bonus feature from inner bonus wheel 716 and a second bonus prize or bonus feature from outer bonus wheel 714. In some implementations, the prize or feature awarded from inner bonus wheel 716 may be modified by the prize or feature awarded from outer bonus wheel 714, such as, for example, where a multiplier feature (e.g., a free games multiplier or a credit prize multiplier) is selected from outer bonus wheel 714, e.g., if the inner bonus wheel indicates "10" and the outer bonus wheel indicates "Wilds Added," 10 wilds would be added.

Figure 9:
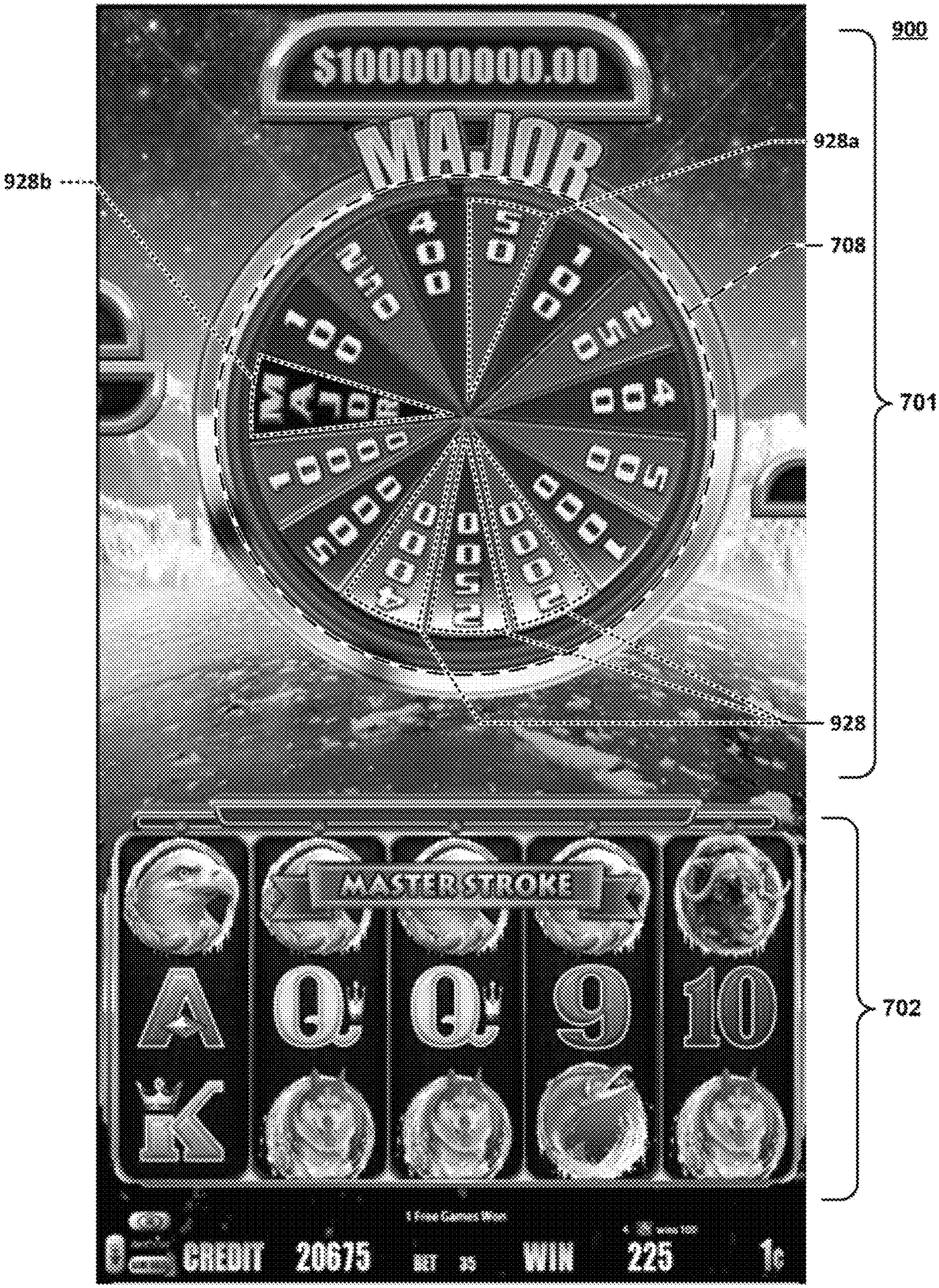
FIG. 9 is a screenshot of the wheel-based bonus game shown at FIG. 8, in which a secondary jackpot wheel is triggered from the bonus wheel.

In addition, and with reference now to FIG. 9, a player may also be provided an opportunity to spin one of secondary jackpot wheels 706-712 in response to a determination by processor 60 that a selected stop position 726 on outer bonus wheel 714 corresponds to (or is associated with) a jackpot wheel feature, such as jackpot wheel feature 724 (step 608). Specifically, processor 60 may replace bonus wheel 704 with a selected secondary jackpot wheel 706-712, as shown at screenshot 900, in response to selection of jackpot wheel feature 724, and such that the selected secondary jackpot wheel 706-712 is displayed (step 610). In the example implementation, processor 60 may randomly select a secondary jackpot wheel 706-712. In other implementations, however, a jackpot wheel 706-712 may be selected, at least in part, based upon a wager amount or other factor. For example, larger wagers may increase the odds that a jackpot wheel 706-712 associated with a larger jackpot (e.g., a GRAND or MAJOR jackpot) may be selected, while smaller wagers may increase the odds that a jackpot wheel 706-712 associated with a smaller jackpot (e.g., a MINOR or MINI jackpot) may be selected.

In some implementations, processor 60 may substitute a plurality of bonus indicia and/or jackpot indicia, such as GRAND, MAJOR, MINOR, and MINI jackpot indicia (not shown) over the stop positions 720 arranged on inner bonus wheel 716 as part of an animation intended to illustrate selection of one of jackpot wheels 706-712. However, in other implementations, the jackpot wheel selection process may not be accompanied by an animation, or it may be accompanied by a different animation. In any case, however, processor 60 may replace bonus wheel 704 with a selected secondary jackpot wheel 706-712 and/or display the selected jackpot wheel 706-712. It is to be understood that such "replacement" is done to focus attention on the jackpot wheel being played and is optional.

With continuing reference to FIG. 9, and in the example shown, jackpot wheel 708 (e.g., the MAJOR jackpot wheel) is selected for display. As shown, jackpot wheel 708 (and/or any other selected jackpot wheel 706-712) may include a plurality of jackpot wheel segments or stop positions. Here, jackpot wheel 708 is partitioned into a plurality of stop positions 928. In this example, only a first stop position **928*a* and a second stop position 928*b* are individually labeled, as well as three additional stop positions at the bottom of the jackpot wheel; the remaining stop positions are not labeled to avoid undue visual clutter. However, it will be appreciated that jackpot wheel 708 may include any suitable number of stop positions 928**, such as, for example, fifteen stop positions.

In the example implementation, each of the plurality of stop positions 928 may be associated with a bonus award or jackpot award, e.g., a first award, or a credit prize, e.g., a second award. In addition, although the following description is provided with reference to a jackpot award (and/or a jackpot award wheel segment/stop position), it will be appreciated that, in some implementations, and as described above, stop positions 928 may be more broadly associated with any suitable credit prize and/or bonus award.

For example, and as shown, first stop position **928*a* is associated with a credit prize (e.g., a credit prize of 50 credits), and second stop position 928*b* is associated with a jackpot award (e.g., a MAJOR jackpot award). However, in various implementations, any suitable credit prize and/or jackpot award may be included on a selected jackpot wheel 706-712. Specifically, in at least some implementations, a jackpot award provided at a stop position 928 may correspond to a jackpot wheel 706-712 selected by processor 60. For instance, where processor 60 selects jackpot wheel 706 (corresponding to a GRAND jackpot award), jackpot wheel 706 may include (and/or may be modified to include, as described herein) one or more stop positions associated with the GRAND jackpot award. Similarly, and as shown, where processor 60 selects jackpot wheel 708 (corresponding to a MAJOR jackpot award), jackpot wheel 708 may include (and/or may be modified to include, as described herein) one or more stop positions associated with the MAJOR jackpot award. Jackpot wheels 710 and 712** (corresponding to MINOR and MINI jackpot awards) may also be organized and/or modified in this way.

During gameplay, processor 60 may select one of the plurality of stop positions 928, such as, for example, in advance of providing a credit prize and/or jackpot award associated with the stop position 928 to a player (step 612). In various implementations, a stop position 928 may be randomly selected by processor 60. However, in other implementations, a stop position 928 may be selected, at least in part, based upon a wager amount. For example, larger wager amounts may increase the odds of winning a jackpot award, while smaller wager amounts may increase the odds of winning a credit prize.

Figure 10:
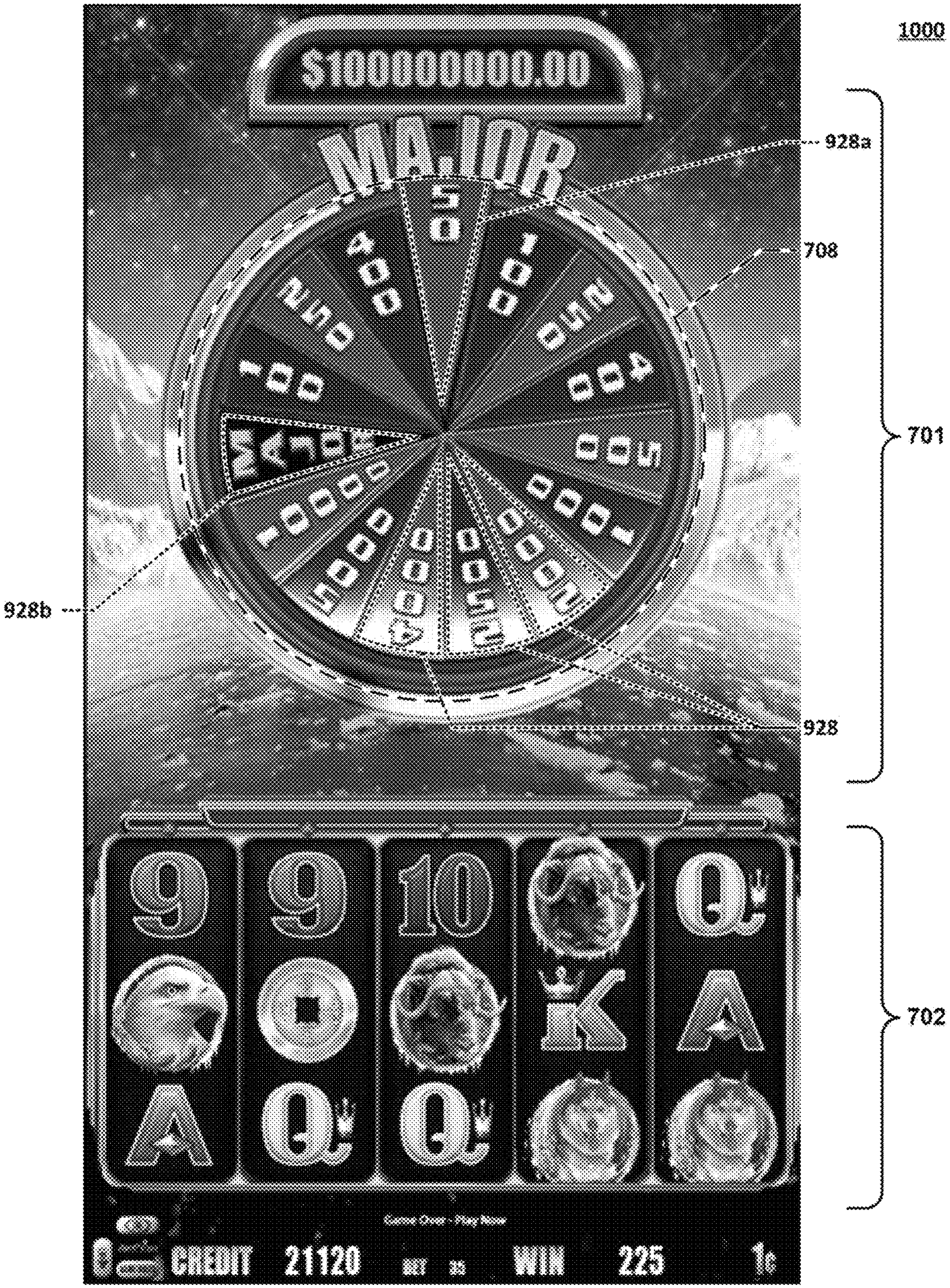
FIG. 10 is a screenshot of the wheel-based bonus game shown at FIG. 9, in which a credit prize is awarded from the secondary jackpot wheel.

Further, with reference to FIG. 10, in response to selection of a particular stop position 928, processor 60 may halt rotation of jackpot wheel 708, such that the selected stop position 928 is highlighted or otherwise indicated as having been selected, and the credit prize and/or jackpot award associated with the selected stop position 928 provided to the player. For instance, and in the example shown, first stop position 928*a* is selected by processor 60, and the credit prize (e.g., 50 credits) associated with first stop position 928*a* is provided to the player.

Figure 11:
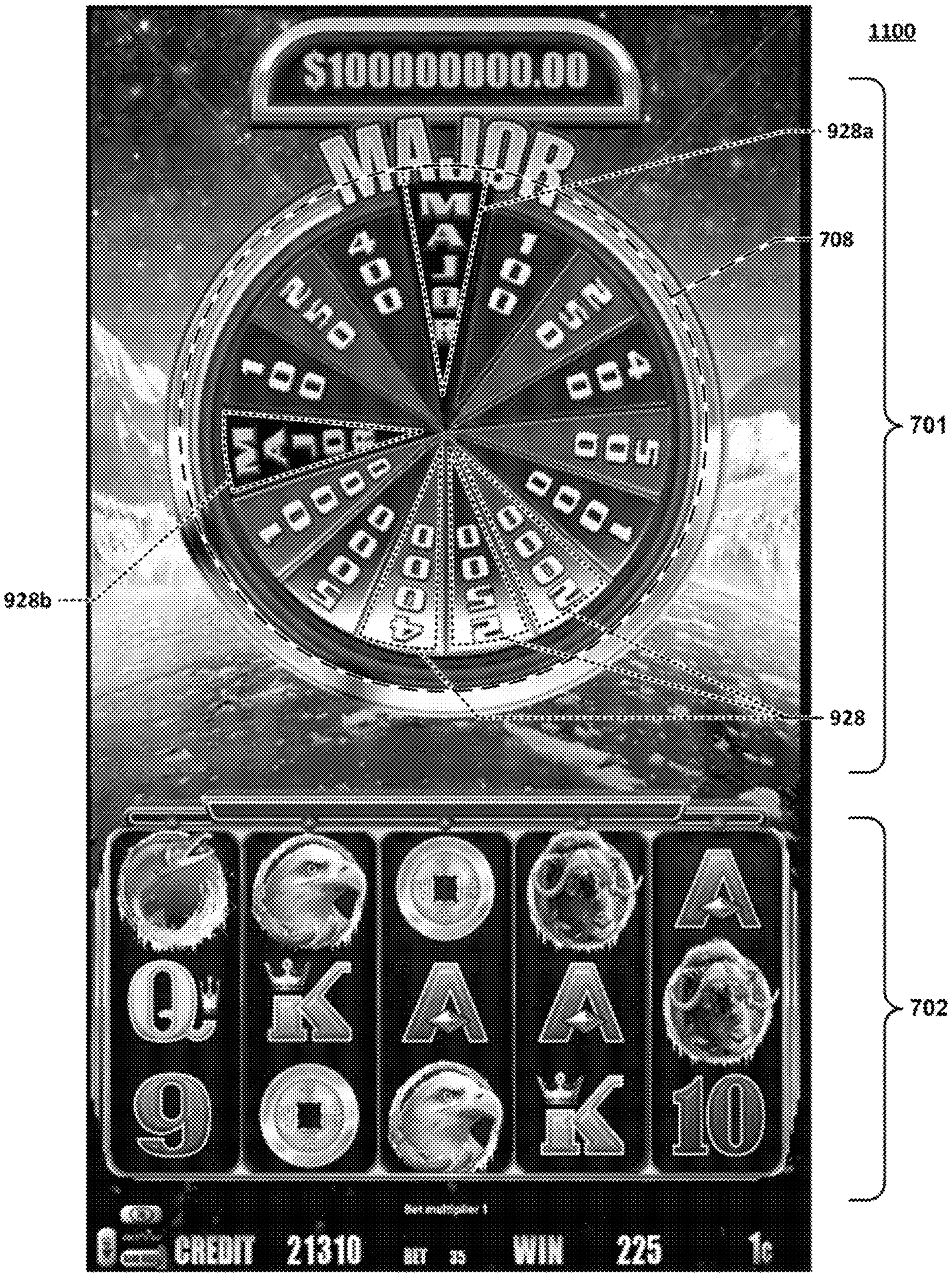
FIG. 11 is a screenshot of the wheel-based bonus game shown at FIG. 10, in which the credit prize is replaced by a jackpot award.

With reference now to FIG. 11, in addition to providing the credit prize associated with a selected stop position (e.g., first stop position 928*a*), processor 60 may also replace the credit prize shown at the selected stop position with a jackpot award, i.e., change the association of that stop position from an association with a second award to an association with a first award, such as a second jackpot award 1102 (step 614). A selected stop position may thus be regarded as "metamorphosing" from a credit prize to a jackpot award. In this example, second stop position 928*a*, which was previously associated with a credit prize, is associated (or re-associated) with a jackpot award, such as, for example, a MAJOR jackpot award. Thus, after a first spin of jackpot wheel 708, there are, in this example, two jackpot awards provided on the wheel 708 (e.g., the jackpot award at stop position 928*b* and jackpot award 1102 at stop position 928*a*).

In the example implementation, gameplay may continue in this manner, such that, each time a jackpot wheel 706-712 is selected and spun by processor 60, a selected credit prize is awarded to the player landing on the credit prize, and the stop position associated with the credit prize is replaced with a jackpot award. These changes to a jackpot wheel 706-712 may be persistent over time, such that jackpot awards added to a particular jackpot wheel 706-712 are not removed from the jackpot wheel 706-712, even in the circumstance that a player ends a gaming session during which a particular jackpot award was added to a jackpot wheel 706-712. In other words, a player may terminate a gaming session without affecting the jackpot awards added during the gaming session to a jackpot wheel 706-712.

In the example implementation, one or more jackpot awards added to a jackpot wheel 706-712 may, however, be removed from the jackpot wheel 706-712 in response to selection, by processor 60, of any of the jackpot awards added to the jackpot wheel 706-712. Specifically, one or more jackpot awards added to a jackpot wheel 706-712 may be removed when a player lands on or wins a particular jackpot award. For example, a player may play the bonus game described above until the jackpot award at stop position 928*a* and/or the jackpot award at stop position 928*b* is selected by processor 60 and provided to the player. In response to such an event, processor 60 may remove the jackpot awards at stop position 928*a* and stop position 928*b*. In some implementations, the jackpot award at stop position 928*b*, which was not added as a result of player activity, may not be removed by processor 60, but may persist irrespective of an outcome on jackpot wheel 708.

Implementations of the system and method of electronic gaming, as described above, thus facilitate a bonus game in which a bonus wheel may trigger a separate jackpot wheel. The jackpot wheel may include a plurality of stop positions, many of which may be associated with one or more credit prizes. When a player lands on a stop position associated with a credit prize, the credit prize may be awarded, and the credit prize previously associated with the stop position may be replaced by (or "metamorphose" into) a jackpot award. As gameplay progresses, the number of jackpot awards included on the jackpot wheel may increase, such that a player's odds of winning a jackpot award also increase. In addition, jackpot awards added to a jackpot wheel may persist over time irrespective of player gaming session, such that a subsequent player may win a jackpot award added during an earlier player's gaming session. Players are encouraged, as a result, to continue gameplay, once it has begun, until a jackpot award is won.

As indicated above, the process may be embodied in computer software. The computer software could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the computer software can be executed by different devices, for example in a client server relationship. Persons skilled in the art, will appreciate that computer software provides a series of instructions executable by the processor.

It is to be understood that the phrase "for each <item> of the one or more <items>," if used herein, should be understood to be inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood.

Terms such as "about," "approximately," "substantially," "nominal," or the like, when used in reference to quantities or similar quantifiable properties, are to be understood to be inclusive of values within ±10% of the values or relationship specified (as well as inclusive of the actual values or relationship specified), unless otherwise indicated.

The disclosure is not limited to the specific implementations described herein, but rather, components of the systems and/or articles and/or steps of the methods may be utilized independently and separately from other components and/or steps described herein. For example, the configuration of components described herein may also be used in combination with other processes, and is not limited to practice with the systems, articles, and related methods as described herein. Rather, the example implementation can be implemented and utilized in connection with many applications in which a game or bonus game is desired.

Although specific features of various implementations of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the implementations of the present disclosure, including the best mode, and also to enable any person skilled in the art to practice the disclosure, including making and using any devices or systems and performing any incorporated methods. The patentable scope of the implementations described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A method of providing a wagering game on an electronic gaming system, the electronic gaming system including a game controller and one or more displays, and the method comprising:

(a) causing, via the game controller, a first bonus game associated with one or more first awards and one or more second awards to be displayed on the one or more displays of the electronic gaming system, the first bonus game including a depiction of a first construct having a plurality of first stop positions that are each associated with an award selected from the group consisting of: the first awards and the second awards, wherein the first construct includes graphical indicators of each first stop position and of the award associated with each first stop position;

(b) receiving, via the game controller, an indication of one or more trigger events;

(c) selecting, by the game controller, one or more of the first stop positions responsive, at least in part, to receipt of each indication of one of the one or more trigger events; and (d) causing, via the game controller, at least one of the one or more first stop positions that are selected in response to receipt of the indication of one of the one or more trigger events and are, at the time of such selection, associated with one of the one or more second awards to be associated with one of the one or more first awards instead.

2. The method of claim 1, wherein each of the one or more first awards is a jackpot award and each of the one or more second awards is a non-jackpot award.

3. The method of claim 2, wherein each of the non-jackpot awards is selected from the group consisting of: a fixed credit amount, a multiplier bonus applicable in a primary wagering game of the electronic gaming system, one or more wild symbols applicable in the primary wagering game of the electronic gaming system, a free play of the first bonus game, a free play of a base game associated with the first bonus game, a free play of a second bonus game, an additional selection of one of the stop symbols, and a no-value award.

4. The method of claim 2, wherein each of the one or more jackpot awards is selected from the group consisting of: a progressive award, an award with a value selected from a set of one or more award values associated with the wagering game that are at least four times higher than a highest award value of the wagering game that is not in the set of one or more award values, and an award with a value selected from a set of one or more award values associated with the wagering game that are at least forty times higher than a highest award value of the wagering game that is not in the set of one or more award values.

5. The method of claim 1, wherein the construct is selected from the group consisting of one or more wheels, one or more reels, one or more dice, and a grid-based treasure map.

6. The method of claim 2, further comprising:

causing, responsive to one of the first stop positions associated with one of the one or more non-jackpot awards being selected, the non-jackpot award associated with that selected first stop position to be awarded to a first player; and causing, responsive to at least one of the first stop positions associated with one of the one or more jackpot awards being selected, the jackpot award associated with that selected first stop position to be awarded to the first player.

7. The method of claim 6, further comprising causing, by the game controller and responsive to the one of the first stop positions associated with the one of the one or more non-jackpot awards being selected, the graphical indicator associated with the selected first stop position to be updated to reflect the first award newly associated with the selected first stop position after the non-jackpot award associated with the selected first stop position has been awarded to the first player.

8. The method of claim 1, further comprising causing the graphical indicator for each first stop position associated with one of the one or more first awards to update to indicate the associated first award responsive to (d).

9. The method of claim 1, further comprising:

causing a base game to be displayed on the one or more displays;

causing a second bonus game to be displayed on the one or more displays, the second bonus game including a depiction of a second construct having a plurality of second stop positions, wherein one or more of the second stop positions is associated with an opportunity to play the first bonus game; and causing, responsive to an outcome of the base game, a second stop position of the plurality of second stop positions to be selected, wherein the selection of the second stop position is one of the trigger events.

10. The method of claim 9, further comprising receiving a signal indicating a player input after the selection of the second stop position, wherein the receipt of the signal indicating a player input is another of the one or more trigger events that, in combination with the selection of the second stop position, cause (c) to occur.

11. An electronic gaming system, comprising:

one or more displays; and a game controller that includes one or more processors and one or more memory devices, wherein:

the one or more processors, the one or more memory devices, and the one or more displays are operably connected, and the one or more memory devices store computer-executable instructions for controlling the one or more processors to:

(a) cause a first bonus game associated with one or more first awards and one or more second awards to be displayed on the one or more displays, the first bonus game including a depiction of a first construct having a plurality of first stop positions that are each associated with an award selected from the group consisting of: the first awards and the second awards, wherein the first construct includes graphical indicators of each first stop position and of the award associated with each first stop position;

(b) receive an indication of one or more trigger events;

(c) select one or more of the first stop positions responsive, at least in part, to receipt of each indication of one of the one or more trigger events; and (d) cause at least one of the one or more first stop positions that are selected in response to receipt of the indication of one of the one or more trigger events and are, at the time of such selection, associated with one of the one or more second awards to be associated with one of the one or more first awards instead.

12. The electronic gaming system of claim 11, wherein the one or more memory devices further store computer-executable instructions for controlling the one or more processors to cause, responsive to an award of one of the one or more first awards, at least the first stop positions associated with that same first award to be reduced in number by at least associating one or more of them with one or more of the one or more second awards instead.

13. The electronic gaming system of claim 11, wherein the one or more memory devices further store computer-executable instructions for controlling the one or more processors to maintain the association of each first stop position with the associated first or second award for that first stop position during play of a base game provided by the electronic gaming machine.

14. The electronic gaming system of claim 13, wherein the one or more memory devices further store computer-executable instructions for controlling the one or more processors to:

perform one or more instances of (c) during play of the first bonus game by a first player;

perform one or more instances of (c) during play of the first bonus game by a second player, wherein the second player is the next player to play the first bonus game after the first player stops playing the first bonus game; and preserve the associations made in (d) during play of the first bonus game by the first player for play of the first bonus game by the second player.

15. The electronic gaming system of claim 11, wherein the one or more memory devices further store computer-executable instructions for controlling the one or more processors to select the one or more first stop positions in (c), by the game controller, such that each first stop position has an equal chance of being selected.

16. The electronic gaming system of claim 11, wherein the one or more memory devices further store computer-executable instructions for controlling the one or more processors to select the one or more first stop positions in (c) such that each first stop position associated with one of the one or more first awards has a lower chance of being selected than each first stop position associated with one of the one or more second awards.

17. The electronic gaming system of claim 11, wherein the one or more memory devices further store computer-executable instructions for controlling the one or more processors to:

cause each first stop position of the one or more first stop positions associated with one of the one or more first awards to have a first chance of selection in (c) as compared with the first stop positions associated with one of the one or more second awards responsive to receipt of an indication that a player has made a wager within a threshold amount, and cause each first stop position of the one or more first stop positions associated with one of the one or more first awards to have a second chance of selection in (c) as compared with the first stop positions associated with one of the one or more second awards responsive to receipt of an indication that a player has made a wager above the threshold amount, wherein the first chance is higher than the second chance.

18. The electronic gaming system of claim 11, wherein the one or more memory devices further store computer-executable instructions for controlling the one or more processors to cause the graphical indicator for each first stop position that is associated with one of the one or more second awards and is selected in (c) to be updated to indicate the first award newly associated with the first stop position therefor, wherein the one or more graphical indicators that are updated to indicate the first award or awards newly associated with the one or more first stop positions therefor are caused to have a different visual appearance from any other graphical indicators that indicated one of the first awards prior to (c).

19. The electronic gaming system of claim 11, wherein the construct is a wheel.

20. A non-transitory, computer-readable storage device storing computer-executable instructions for controlling one or more processors of a game controller to provide a wagering game on an electronic gaming system having the game controller, wherein the computer-executable instructions for controlling the one or more processors to provide the wagering game on the electronic gaming system include computer-executable instructions for causing the one or more processors to:

(a) cause a first bonus game associated with one or more first awards and one or more second awards to be displayed on one or more displays of the electronic gaming system, the first bonus game including a depiction of a first construct having a plurality of first stop positions that are each associated with an award selected from the group consisting of: the first awards and the second awards, wherein the first construct includes graphical indicators of each first stop position and of the award associated with each first stop position;

(b) receive an indication of one or more trigger events;

(c) select one or more of the first stop positions responsive, at least in part, to receipt of each indication of one of the one or more trigger events; and (d) cause at least one of the one or more first stop positions that are selected in response to receipt of the indication of one of the one or more trigger events and are, at the time of such selection, associated with one of the one or more second awards to be associated with one of the one or more first awards instead.

* * * * *